United States Patent
Iga et al.

(10) Patent No.: US 11,760,857 B2
(45) Date of Patent: Sep. 19, 2023

(54) METHOD FOR PRODUCING LATEX AND METHOD FOR PRODUCING HOLLOW RESIN PARTICLES

(71) Applicant: ZEON CORPORATION, Tokyo (JP)

(72) Inventors: Takashi Iga, Tokyo (JP); Takeshi Hirata, Tokyo (JP); Nozomi Yabuki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 613 days.

(21) Appl. No.: 16/634,233

(22) PCT Filed: Jul. 31, 2018

(86) PCT No.: PCT/JP2018/028634
§ 371 (c)(1),
(2) Date: Jan. 27, 2020

(87) PCT Pub. No.: WO2019/026899
PCT Pub. Date: Feb. 7, 2019

(65) Prior Publication Data
US 2021/0087349 A1 Mar. 25, 2021

(30) Foreign Application Priority Data

Aug. 1, 2017 (JP) .................................. 2017-149074
Jan. 31, 2018 (JP) .................................. 2018-015976

(51) Int. Cl.
C08J 9/20 (2006.01)
C08F 2/44 (2006.01)
C08F 6/24 (2006.01)
C08J 3/03 (2006.01)
C08L 13/02 (2006.01)

(52) U.S. Cl.
CPC .................. *C08J 9/20* (2013.01); *C08F 2/44* (2013.01); *C08F 6/24* (2013.01); *C08J 3/03* (2013.01); *C08L 13/02* (2013.01); *C08J 2313/02* (2013.01)

(58) Field of Classification Search
CPC ...................................... C08J 3/02; C08J 3/03
See application file for complete search history.

(56) References Cited

U.S. PATENT DOCUMENTS

| 4,798,691 A * | 1/1989 | Kasai .................... B01J 13/185 |
| | | 524/832 |
| 6,139,961 A | 10/2000 | Blankenship et al. |
| 2005/0113505 A1* | 5/2005 | Watanabe ............ C08F 257/02 |
| | | 524/458 |
| 2018/0186960 A1 | 7/2018 | Hyogo et al. |

FOREIGN PATENT DOCUMENTS

| JP | S61-87734 A | 5/1986 |
| JP | S62-127336 A | 6/1987 |
| JP | H02-43948 A | 2/1990 |
| JP | H06-248012 A | 9/1994 |
| JP | H11-349839 A | 12/1999 |
| JP | 2002-80503 A | 3/2002 |
| JP | 2002-265529 A | 9/2002 |
| JP | 2004-123834 A | 4/2004 |
| JP | 2004-190038 A | 7/2004 |
| JP | 2007-220731 A | 8/2007 |
| JP | 2008-231241 A | 10/2008 |
| JP | 2013-221070 A | 10/2013 |
| WO | 2017/002659 A1 | 1/2017 |

OTHER PUBLICATIONS

Machine translation of JP 2004-123834 by Maenaka et al. (Year: 2004).*
Notification of Transmittal of Translation of the International Preliminary Report on Patentability (Form PCT/IB/338) issued in counterpart International application No. PCT/JP2018/028634 dated Feb. 13, 2020 with Forms PCT/IB/373 and PCT/ISA/237. (13 pages).

* cited by examiner

*Primary Examiner* — Christopher M Rodd
(74) *Attorney, Agent, or Firm* — WHDA, LLP

(57) ABSTRACT

Provided is a method for producing a latex comprising hollow resin particles each with a high void ratio and a method for producing hollow resin particles each with a higher void ratio. In the method for producing the latex: a suspension treatment of the mixture liquid which comprises a monomer, a crosslinkable monomer, an oil-soluble polymerization initiator, a fat/fatty oil, a hydrocarbon solvent, a suspension stabilizer and an aqueous medium is carried out to prepare a suspension comprising monomer drops; a polymerization reaction of the suspension is carried out to prepare a precursor composition which comprises precursor particles each having a hollow portion including the hydrocarbon solvent.

13 Claims, 5 Drawing Sheets

METHOD FOR PRODUCING LATEX AND METHOD FOR PRODUCING HOLLOW RESIN PARTICLES

TECHNICAL FIELD

The present disclosure relates to a method for producing a latex containing latex particles each having a hollow portion with a higher void ratio than before and a method for producing hollow resin particles each with a higher void ratio than before.

BACKGROUND ART

Hollow resin particles can scatter light well and can reduce light transmissivity as compared to resin particles having practically no voids in their interiors; hence, hollow resin particles are widely used in uses of, for example, aqueous coating materials and paper coating compositions, as organic pigments and masking agents excellent in optical properties such as opacity and whiteness.

Meanwhile, in uses of, for example, aqueous coating materials and paper coating compositions, it is desired that the void ratio of a blended hollow resin particle be increased in order to improve effects such as the weight reduction, acquisition of heat insulating properties, and opacification of, for example, coating materials and paper coating compositions. However, in conventionally known production methods, it has been difficult to stably produce hollow resin particles with high void ratios while satisfying production conditions whereby desired physical properties are obtained.

For example, Patent Literature 1 discloses a technology of forming a particle having a void by forming an emulsion-polymerized multistage polymer particle including a hydrophilic core polymer, a first shell polymer, and a second shell polymer and neutralizing the formed multistage polymer particle with a base to swell the hydrophilic core polymer.

Further, Patent Literature 2 discloses a technology in which a polymerizable monomer component is dispersed in a water-based dispersion medium in the presence of a different kind of polymer fine particles having a composition different from the composition of the polymerizable monomer component and thereby the different kind of polymer fine particles are caused to absorb the polymerizable monomer component, and next the polymerizable monomer component is polymerized. The literature mentions that, in a water-based dispersion medium, a different kind of polymer is placed in a state of fine particles or a solution together with a polymerizable monomer component, that thereby during polymerization a nucleus is formed in a disperse particle by phase separation of the different kind of polymer, and polymerization shrinkage of a polymer that is being generated on the nucleus occurs, and that consequently a hole is formed in the interior of the polymer.

Further, Patent Literature 3 discloses a method for producing hollow polymer particles in which a latex containing polymer particles each of which has a layered structure with at least three layers comprising a central layer polymer obtained by copolymerizing a monomer mixture of 20 to 60% by mass of a carboxyl group-containing monomer and 80 to 40% by mass of a monomer copolymerizable with this carboxyl group-containing monomer, an intermediate layer polymer obtained by copolymerizing a monomer mixture of 1 to 12% by mass of a carboxyl group-containing monomer and 99 to 88% by mass of a monomer copolymerizable with this carboxyl group-containing monomer, and a surface layer polymer obtained by polymerizing a monomer not containing a carboxyl group is prepared, and a base is added to the latex to set the pH of the latex at 8 or more and subsequently an acid is added to the latex to set the pH of the latex at 7 or less.

Further, Patent Literature 4 discloses a method of producing a thermally expandable minute sphere comprising, as essential components, an outer shell comprising a thermoplastic resin and a blowing agent included in the outer shell. The literature mentions that thermally expandable minute spheres each having a prescribed average particle diameter can be produced stably with good yield without degrading expansion ability.

Further, Patent Literature 5 discloses that hollow resin particles were obtained by a method in which, when producing hollow resin particles, (1) a dispersion phase containing a vinyl monomer not having a nitrile group, a phase separation accelerator, a volatile solvent, a polymerization initiator, and a reaction catalyst was prepared, (2) a continuous phase containing a solvent and a surfactant was prepared, (3) the dispersion phase was added to the continuous phase and then the obtained mixture was stirred, (4) the obtained water dispersion was subjected to polymerization reaction under a pressurized condition, (5) the mixture after polymerization reaction was depressurized at a temperature more than or equal to the boiling point of the volatile solvent and thereby a water-based dispersion was obtained, and (6) the obtained water-based dispersion was filtered and dried. The literature mentions that, since the resin contained in the shell of the hollow resin particle comprises a vinyl monomer not having a nitrile group, a nitrile group is not eliminated even at high temperature and the strength of the shell is less likely to be reduced.

Patent Literature 6 discloses a method of producing hollow polymer particles by polymerizing a dispersion containing a hydrophilic monomer, a crosslinkable monomer, and another monomer together with an oily substance and then removing the oily substance in particles in liquid or in a gaseous atmosphere.

Patent Literature 7 discloses a method of producing hollow particles with a suppressed level of depressions by removing an organic solvent included in fine particles in a water medium to make the fine particles hollow.

Patent Literature 8 discloses a hollow high molecular fine particle with a high content ratio of a crosslinkable monomer.

CITATION LIST

Patent Literature

[Patent Literature 1] JP H11(1999)-349839 A
[Patent Literature 2] JP S62(1987)-127336 A
[Patent Literature 3] JP H6(1994)-248012 A
[Patent Literature 4] WO 2017/002659 A
[Patent Literature 5] JP 2008-231241 A
[Patent Literature 6] JP S61(1986)-87734 A
[Patent Literature 7] JP 2013-221070 A
[Patent Literature 8] JP 2002-80503 A

SUMMARY OF INVENTION

Technical Problem

However, Patent Literature 1 has no description on the evaluation of the void ratio of the multistage polymer particle.

Further, Patent Literature 2 mentions that polymer particles having inner holes can be produced easily. However, the polymer particle described in Patent Literature 2 has the problem of the void ratio being low.

Patent Literature 3 mentions that a hollow polymer particle having a shell thickness of 50 nm or less and a large void ratio is produced. However, the hollow polymer particles actually disclosed in Examples of Patent Literature 3 have only limited void ratios of approximately 70%. Further, the method described in Patent Literature 3 has the problem of being poor in productivity.

Patent Literature 4 mentions that a nitrile-based monomer is preferably contained as an essential component from the viewpoint of expansion ability. However, a resin particle containing a nitrile-based monomer is generally poor in heat resistance. Further, in the technology of Patent Literature 4, blowing with a blowing agent and thermal expansion reaction are utilized to expand a minute sphere, and hence there is a problem of difficulty in precise control of the particle diameter of the minute sphere.

Further, Patent Literature 5 mentions that, by performing depressurization at a temperature more than or equal to the boiling point of the volatile solvent, the resin is expanded by pressure at the time of the volatilization of the included volatile solvent, and a hollow resin particle is formed. However, since a particle is expanded by performing depressurization while giving heat to the particle, there is a problem that the particle diameters of obtained hollow resin particles are uneven.

The technology of Patent Literature 6 has a problem that, when it is attempted to fabricate a hollow particle with a small shell thicknesses by increasing the amount of the oily substance, the particle is crushed when removing the oily substance because the strength of the shell is low, and a particle with a high void ratio is not obtained.

The hollow particle produced by the method described in Patent Literature 7 includes water, and the method has a problem that a step of removing the internal water is needed when the hollow particle is used in uses of, for example, heat insulating agents, and at this stage the particle is depressed and the void ratio is reduced.

In the case where the ratio of a crosslinkable monomer is high like in the hollow high molecular fine particle described in Patent Literature 8, there is a problem of being poor in productivity because high-temperature, long-time treatment is needed to remove an internal hydrocarbon.

An object of the present disclosure is to provide a method for producing a latex containing hollow resin particles each with a higher void ratio than before and a method for producing hollow resin particles each with a higher void ratio than before.

Solution to Problem

The present inventors focused attention on using an oil-soluble polymerization initiator in a method of obtaining a latex containing latex particles each having a hollow portion by suspension polymerization. Further, the present inventors gave attention to the fact that a copolymer including a hydrophilic monomer unit reacts with a base to develop alkali-swelling. From these findings, the present inventors have found out that the void ratio of a latex particle in the obtained latex can be controlled more greatly than before by using a dispersion in which appropriate materials are dispersed in an aqueous medium.

Further, the present inventors focused attention on the fact that, in a method of obtaining hollow resin particles by suspension polymerization, particularly a later treatment after polymerization reaction is important to keep a hollow spherical shape having a high void ratio. Further, the present inventors closely examined the kind of a polymer contained in a hollow resin particle in order to enhance the heat resistance of the hollow resin particle. As a result, the present inventors have found out that hollow resin particles each having a higher void ratio than before and having excellent heat resistance are obtained by using a specified monomer at the time of polymerization and performing solid-liquid separation after polymerization.

Accordingly, a first production method of the present disclosure is a method for producing a latex comprising latex particles each having a hollow portion, and the method comprises steps of:

preparing a mixture liquid comprising at least one monomer selected from the group consisting of a monovinyl monomer and a hydrophilic monomer, a crosslinkable monomer, an oil-soluble polymerization initiator, a fat/fatty oil, a hydrocarbon solvent, a suspension stabilizer and an aqueous medium;

carrying out a suspension treatment of the mixture liquid to prepare a suspension which comprises monomer drops comprising the hydrocarbon solvent dispersed in the aqueous medium;

carrying out a polymerization reaction of the suspension to prepare a precursor composition comprising precursor particles each having a hollow portion including the hydrocarbon solvent;

adding a base to the precursor composition to set a pH of the precursor composition at 6.0 or more; and, removing the hydrocarbon solvent included in the precursor particles in the precursor composition to obtain the latex comprising the latex particles each having the hollow portion.

In the first production method of the present disclosure, the at least one monovinyl monomer and the at least one hydrophilic monomer may be used in combination with each other.

In the first production method of the present disclosure, an amount ratio of the at least one hydrophilic monomer may be from 10% to 50% by mass provided that a total amount of the at least one monovinyl monomer and the at least one hydrophilic monomer is regarded as 100% by mass.

In the first production method of the present disclosure, a number average particle diameter of the latex particles included in the obtained latex may be from 0.1 μm to 10 μm.

In the first production method of the present disclosure, a void ratio of the latex particles included in the obtained latex may be 70% to 99%.

A second production method of the present disclosure is a method for producing hollow resin particles, and the method comprises steps of:

preparing a mixture liquid comprising at least one monomer selected from the group consisting of a monovinyl monomer and a hydrophilic monomer excluding acrylonitrile and methacrylonitrile, a crosslinkable monomer, an oil-soluble polymerization initiator, a hydrocarbon solvent, a suspension stabilizer and an aqueous medium, wherein an amount of the contained crosslinkable monomer is from 25 parts by mass to 59 parts by mass provided that a total amount of the at least one monomer selected from the group consisting of a monovinyl monomer and a hydrophilic monomer and the crosslinkable monomer is regarded as 100 parts by mass;

carrying out a suspension treatment of the mixture liquid to prepare a suspension which comprises monomer drops comprising the hydrocarbon solvent dispersed in the aqueous medium;

carrying out a polymerization reaction of the suspension to prepare a precursor composition comprising precursor particles each having a hollow portion including the hydrocarbon solvent;

carrying out a solid-liquid separation of the precursor composition to obtain the precursor particles; and, removing the hydrocarbon solvent included in the precursor particles in a gaseous atmosphere to obtain the hollow resin particles.

In the second production method of the present disclosure, the monovinyl monomer may be one selected from the group consisting of acrylate and methacrylate, and the hydrophilic monomer may be one selected from the group consisting of acrylic acid and methacrylic acid.

In the second production method of the present disclosure, a method for solid-liquid separation of the precursor composition may be centrifugation or filtration.

In the second production method of the present disclosure, the step of preparing the mixture liquid may be a step of mixing an oil phase comprising at least one monomer selected from the group consisting of a monovinyl monomer and a hydrophilic monomer, a crosslinkable monomer, an oil-soluble polymerization initiator, and a hydrocarbon solvent, wherein an amount of the contained crosslinkable monomer is from 25 parts by mass to 59 parts by mass provided that a total amount of the at least one monomer selected from the group consisting of a monovinyl monomer and a hydrophilic monomer and the crosslinkable monomer is regarded as 100 parts by mass, with an aqueous phase comprising a suspension stabilizer and an aqueous medium.

In the second production method of the present disclosure, a relative permittivity of the hydrocarbon solvent may be 3 or less at 20° C.

In the second production method of the present disclosure, the hydrocarbon solvent may be a hydrocarbon compound having 5 to 7 carbon atoms.

In the second production method of the present disclosure, an amount of the hydrocarbon solvent may be 200 parts by mass or more provided that a total amount of the at least one monomer selected from the group consisting of a monovinyl monomer and a hydrophilic monomer and the crosslinkable monomer is regarded as 100 parts by mass.

In the second production method of the present disclosure, a number average particle diameter of the obtained hollow resin particles may be from 0.1 μm to 10 μm.

In the second production method of the present disclosure, a void ratio of the obtained hollow resin particles may be from 70% to 99%.

Advantageous Effects of Invention

According to the first production method of the present disclosure like the above, a latex containing latex particles each with a higher void ratio than before can be produced efficiently.

According to the second production method of the present disclosure like the above, a polymerization is conducted to obtain a polymer containing a monomer unit derived from a monovinyl monomer and/or a hydrophilic monomer, solid-liquid separation of a precursor composition obtained after the polymerization is performed, and then a hydrocarbon solvent is removed from precursor particles; thus, hollow resin particles each having a higher void ratio than before and having excellent heat resistance can be produced with high productivity.

DESCRIPTION OF EMBODIMENTS

Figure 1:
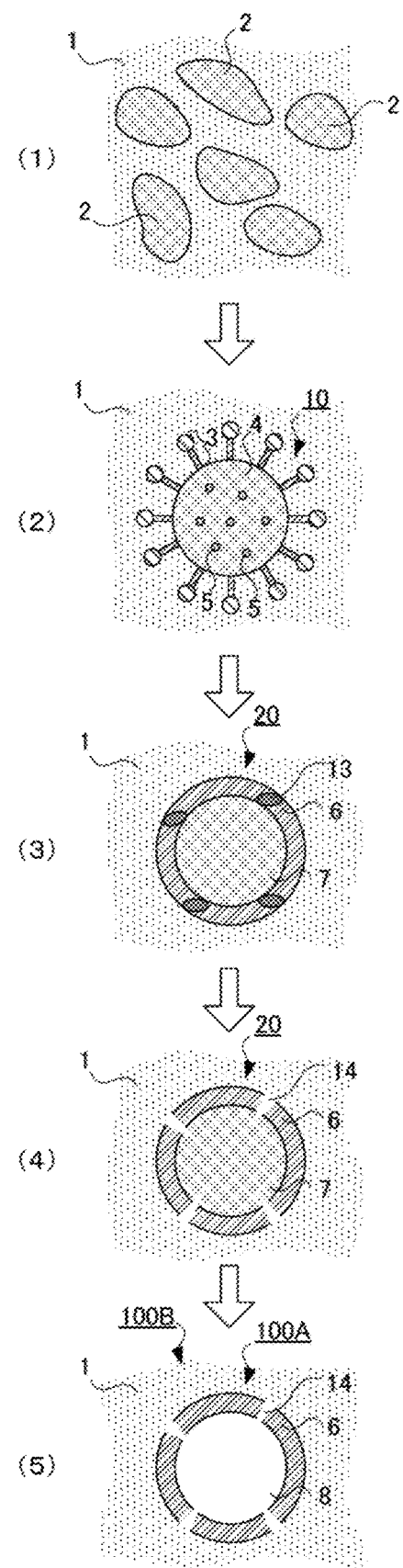
FIG. 1 is a schematic diagram showing an example of a first production method of the present disclosure (a method for producing a latex).

Hereinbelow, in the present disclosure, "hollow" means a state where the presence of at least any one selected from the group consisting of a liquid portion, a gas portion, and a mixed portion of liquid and gas can be determined in the interior of a particle by an ordinary observation method. The "liquid portion" in the present disclosure means a continuous portion filled with liquid. The "gas portion" in the present disclosure means a continuous portion filled with gas. The "mixed portion of liquid and gas" in the present disclosure means a continuous portion filled with liquid and gas.

In the present disclosure, a "hollow portion" means a portion of the interior of a particle occupied by a hollow. Whether a particle has a hollow portion or not can be determined by, for example, SEM observation of a cross section of the relevant particle or TEM observation of the relevant particle as it is.

The shell of resin in a particle may not have a communication hole, and "the hollow portion" in the present disclosure may be isolated from the outside of the particle by the shell of the particle.

The shell of resin in a particle may have one or two or more communication holes, and "the hollow portion" in the present disclosure may communicate with the outside of the particle via the communication hole.

In the present disclosure, a "precursor particle" means a particle of which the hollow portion is filled with water or a mixture of water and gas, or an aqueous medium or a mixture of an aqueous medium and gas. In the present disclosure, a "precursor composition" means a composition containing precursor particles.

In the present disclosure, a "latex particle having a hollow portion" means a particle contained in a latex and having a hollow portion.

In the present disclosure, a "hollow resin particle" means a resin particle of which the hollow portion is filled with gas.

The first production method of the present disclosure is a method for producing a latex comprising latex particles each having a hollow portion, and the method comprises steps of:

preparing a mixture liquid comprising at least one monomer selected from the group consisting of a monovinyl monomer and a hydrophilic monomer, a crosslinkable monomer, an oil-soluble polymerization initiator, a fat/fatty oil, a hydrocarbon solvent, a suspension stabilizer and an aqueous medium;

carrying out a suspension treatment of the mixture liquid to prepare a suspension which comprises monomer drops comprising the hydrocarbon solvent dispersed in the aqueous medium;

carrying out a polymerization reaction of the suspension to prepare a precursor composition comprising precursor particles each having a hollow portion including the hydrocarbon solvent;

adding a base to the precursor composition to set a pH of the precursor composition at 6.0 or more; and, removing the hydrocarbon solvent included in the precursor particles in the precursor composition to obtain the latex comprising the latex particles each having the hollow portion.

The second production method of the present disclosure is a method for producing hollow resin particles, and the method comprises steps of:

preparing a mixture liquid comprising at least one monomer selected from the group consisting of a monovinyl monomer and a hydrophilic monomer excluding acrylonitrile and methacrylonitrile, a crosslinkable monomer, an oil-soluble polymerization initiator, a hydrocarbon solvent, a suspension stabilizer and an aqueous medium, wherein an amount of the contained crosslinkable monomer is from 25 parts by mass to 59 parts by mass provided that a total amount of the at least one monomer selected from the group consisting of a monovinyl monomer and a hydrophilic monomer and the crosslinkable monomer is regarded as 100 parts by mass;

carrying out a suspension treatment of the mixture liquid to prepare a suspension which comprises monomer drops comprising the hydrocarbon solvent dispersed in the aqueous medium;

carrying out a polymerization reaction of the suspension to prepare a precursor composition comprising precursor particles each having a hollow portion including the hydrocarbon solvent;

carrying out a solid-liquid separation of the precursor composition to obtain the precursor particles; and, removing the hydrocarbon solvent included in the precursor particles in a gaseous atmosphere to obtain the hollow resin particles.

The first and second production methods of the present disclosure are common in that a mixture liquid containing common source materials is suspended and the obtained suspension is subjected to polymerization reaction. Hereinbelow, the first and second production methods are described in order. However, the description regarding the second production method is given only on different points in principle from the first production method unless otherwise noted.

1. First Production Method

The first production method of the present disclosure includes (1) a mixture liquid preparation step, (2) a suspension preparation step, (3) a polymerization step, (4) a base addition step, and (5) a solvent removal step. The steps of the production method of the present disclosure are not limited to these five steps.

FIG. 1 is a schematic diagram showing an example of the first production method of the present disclosure. (1) to (5) in FIG. 1 correspond to steps (1) to (5) mentioned above, respectively. The white arrow between drawings is one for indicating the order of the steps. Incidentally, FIG. 1 and FIG. 2 described later are only schematic diagrams for description, and the production method of the present disclosure is not limited to those shown in these drawings. Further, the structures, dimensions, and shapes of materials used for the production methods of the present disclosure are not limited to the structures, dimensions, or shapes of the various materials in these drawings.

(1) of FIG. 1 is a schematic cross-sectional view showing an embodiment of a mixture liquid in the mixture liquid preparation step. As shown in the drawing, the mixture liquid contains an aqueous medium 1 and a low polarity material 2 dispersed in the aqueous medium 1. Here, the low polarity material 2 means a material that has low polarity and is less likely to mix with the aqueous medium 1, such as a hydrocarbon solvent.

(2) of FIG. 1 is a schematic cross-sectional view showing an embodiment of a suspension in the suspension preparation step. The suspension contains the aqueous medium 1 and micelle 10 (monomer drop) dispersed in the aqueous medium 1. The micelle 10 is formed by surrounding the periphery of an oil-soluble monomer composition 4 (containing, for example, an oil-soluble polymerization initiator 5) with a suspension stabilizer 3 (for example, a surfactant).

(3) of FIG. 1 is a schematic cross-sectional view showing an embodiment of a precursor composition after the polymerization step. The precursor composition contains the aqueous medium 1 and precursor particles 20 dispersed in the aqueous medium 1. A shell 6 located on the outside of the precursor particle 20 is one formed by polymerization of, for example, the monomer in the micelle 10 mentioned above. The hollow portion in the interior of the shell 6 includes a hydrocarbon solvent 7. The shell 6 contains a fat/fatty oil 13.

(4) of FIG. 1 is a schematic cross-sectional view showing an embodiment of a precursor composition after the base addition step. By the addition of the base, the fat/fatty oil is dissolved out to the aqueous medium 1 in the outside, and shell defects 14 are formed. Thereby, the hollow portion of the precursor particle 20 communicates with the outside of the precursor particle 20 via the shell defects 14. Incidentally, the mechanism by which the fat/fatty oil is released from the precursor particle 20 is described later.

(5) of FIG. 1 is a schematic cross-sectional view showing an embodiment of a latex after the solvent removal step. The drawing of (5) shows a state where the hydrocarbon solvent 7 is removed from the precursor particle 20 in (4) mentioned above. As a result, a latex 100B containing latex particles 100A each having a hollow portion 8 in the interior of the shell 6 is obtained. Hollow resin particles are obtained by removing the aqueous medium 1 from the latex 100B and substituting an inside of the hollow portions of the obtained latex particles 100A with gas.

Hereinbelow, the five steps mentioned above and other steps are described in order.

(1) Mixture Liquid Preparation Step

The present step is a step of preparing a mixture liquid containing (A) at least one monomer selected from the group consisting of a monovinyl monomer and a hydrophilic monomer, (B) a crosslinkable monomer, (C) an oil-soluble polymerization initiator, (D) a fat/fatty oil, (E) a hydrocarbon solvent, (F) a suspension stabilizer, and (G) an aqueous medium.

(A) At least one monomer selected from group consisting of monovinyl monomer and hydrophilic monomer In the present disclosure, the monomer means a compound having one polymerizable functional group. As the monomer, a monovinyl monomer may be used singly, a hydrophilic monomer may be used singly, and a monovinyl monomer and a hydrophilic monomer may be used in combination. A polymer or an oligomer is generated by polymerization of the monomer. Incidentally, in the present disclosure, "at least one monomer selected from the group consisting of a monovinyl monomer and a hydrophilic monomer" does not include a "crosslinkable monomer" described later unless otherwise stated. Further, in the present disclosure, "at least one monomer selected from the group consisting of a monovinyl monomer and a hydrophilic monomer" may be written as "(A) the monomer".

In the present disclosure, the monovinyl monomer means a compound having one polymerizable vinyl functional group and other than the hydrophilic monomer described later.

In the present disclosure, examples of the monovinyl monomer include: at least one acrylic-based monovinyl monomer selected from the group consisting of acrylate and methacrylate; aromatic monovinyl monomer such as styrene, vinyltoluene, α-methylstyrene, p-methylstyrene and halogenated styrene; mono-olefin monomer such as and olefins such as ethylene, propylene and butylene; (meth)acrylamide monomer and derivatives thereof such as (meth)acrylamide, N-methylol (meth)acrylamide and N-butoxymethyl (meth)acrylamide; diene-based monomer such as butadiene and isoprene; carboxylic acid vinyl ester monomer such as vinyl acetate; halogenated vinyl monomer such as vinyl chloride; halogenated vinylidene monomer such as vinylidene chloride; and vinyl pyridine monomer. The monovinyl monomer may be at least one acrylic-based monovinyl monomer selected from the group consisting of acrylate and methacrylate.

Examples of the acrylic-based monovinyl monomer include methyl (meth)acrylate, ethyl (meth)acrylate, butyl (meth)acrylate, 2-ethylhexyl (meth)acrylate, lauryl (meth)acrylate, glycidyl (meth)acrylate, 2-hydroxyethyl (meth)acrylate. In the present disclosure, (meth)acrylate means each of acrylate or methacrylate.

Among the acrylic-based monovinyl monomer, it is preferable to use at least one selected from the group consisting of butyl acrylate and methyl methacrylate.

Each of these monovinyl monomers may be used singly, or two or more kinds of these may be used in combination.

In the present disclosure, the hydrophilic monomer means a compound soluble in water, and more specifically means a compound having a solubility in water of 1% by mass or more. This is preferable particularly in that the amount of aggregates in the obtained latex can be kept to a small level by subjecting the hydrophilic monomer to polymerization.

In the present disclosure, examples of the hydrophilic monomer include acid group-containing monomers, hydroxyl group-containing monomers, amide group-containing monomers, and polyoxyethylene group-containing monomers.

The acid group-containing monomer in the present disclosure means a monomer containing an acid group. The acid group herein includes both of a proton donating group (a Brønsted acid group) and an electron pair accepting group (a Lewis acid group). The case where an acid group-containing monomer is used as the hydrophilic monomer is preferable in that a hollow resin particle with high heat resistance is obtained.

The acid group-containing monomer is not particularly limited as long as it has an acid group, and examples include ethylenically unsaturated carboxylic acid monomers such as acrylic acid, methacrylic acid, crotonic acid, cinnamic acid, itaconic acid, fumaric acid, maleic acid, and butenetricarboxylic acid; carboxyl group-containing monomers such as monoalkyl esters of unsaturated dicarboxylic acids, such as monoethyl itaconate, monobutyl fumarate, and monobutyl maleate; and sulfonic acid group-containing monomers such as styrenesulfonic acid. Among acid group-containing monomers, preferably an ethylenically unsaturated carboxylic acid monomer is used, more preferably at least one acrylic-based hydrophilic monomer selected from the group consisting of acrylic acid and methacrylic acid, and a maleic acid monomer are used, and still more preferably an acrylic-based hydrophilic monomer is used. In the case where an acrylic-based hydrophilic monomer ((meth)acrylic acid) and an acrylic-based monovinyl monomer (a (meth)acrylate) described above are used in combination, a preferred mass ratio is (meth)acrylic acid:(meth)acrylate=100:0 to 30:70, and a more preferred mass ratio is (meth)acrylic acid:(meth) acrylate=95:5 to 35:65. Thus, by using monomers resistant to relatively high temperature conditions in combination, such as (meth)acrylic acid and a (meth)acrylate described above, the heat resistance of the obtained hollow resin particle can be enhanced as compared to, for example, the case where a monomer having a nitrile group is used. Incidentally, in the present disclosure, (meth)acrylic acid means each of acrylic acid and methacrylic acid.

The case where a hydroxyl group-containing monomer is used as the hydrophilic monomer is preferable in that the amount of aggregates in the obtained latex can be kept to a small level. Examples of the hydroxyl group-containing monomer include a 2-hydroxyethyl acrylate monomer, a 2-hydroxyethyl methacrylate monomer, a 2-hydroxypropyl acrylate monomer, a 2-hydroxypropyl methacrylate monomer, and a 4-hydroxybutyl acrylate monomer.

Examples of the amide group-containing monomer include an acrylamide monomer and a dimethylacrylamide monomer.

Examples of the polyoxyethylene group-containing monomer include a methoxypolyethylene glycol acrylate monomer and a methoxypolyethylene glycol methacrylate monomer.

Each of these hydrophilic monomers may be used singly, or two or more kinds of these may be used in combination.

In the first production method, one or two or more monovinyl monomers and one or two or more hydrophilic monomers may be used in combination. The reason is as follows.

Figure 6A:
FIG. 6A is a schematic diagram of a conventional core resin particle.
Figure 6B:
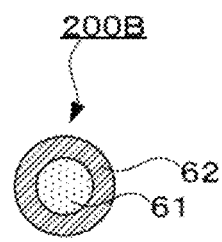
FIG. 6B is a schematic cross-sectional view of a conventional core-shell resin particle.
Figure 6C:
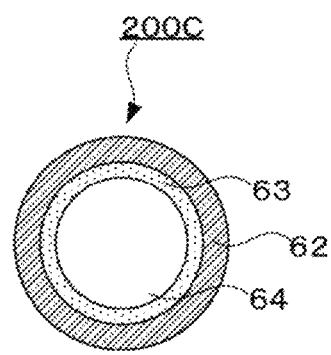
FIG. 6C is a schematic cross-sectional view of a conventional hollow resin particle.

FIG. 6A to FIG. 6C show stages of a production process of a conventional hollow resin particle. FIG. 6A is a schematic diagram of a core resin particle 61. FIG. 6B is a schematic cross-sectional view of a core-shell resin particle 200B. FIG. 6C is a schematic cross-sectional view of a hollow resin particle 200C.

Conventionally, a core resin particle 61 containing an alkali-swelling substance in the interior has been formed (FIG. 6A), and a shell 62 has been formed on the outside of the core resin particle 61 (FIG. 6B). A hollow resin particle 200C having three layers including a hollow portion 64, a hollow core 63, and the shell 62 has been produced by adding a base to utilize the swelling of the core resin particle 61 (FIG. 6C). However, the void ratio of the hollow resin particle produced by this method is as low as 55% or less.

In a preferred embodiment of the first production method, the shell of a hollow resin particle is swollen in the base addition step described later by using a monovinyl monomer and a hydrophilic monomer in combination; thus, the removal of the hydrocarbon solvent is made easier, and the void ratio of the obtained hollow resin particle can be improved over previous ones.

Provided that the total mass of materials (A) to (F) mentioned above is regarded as 100% by mass, the mass ratio of (A) the monomer is preferably 5 to 50% by mass, and more preferably 10 to 40% by mass. By the mass ratio mentioned above of (A) the monomer being 5 to 50% by mass, the mechanical characteristics of the hollow resin particle can be improved over previous ones to such a degree that a hollow of the hollow resin particle in the obtained latex can be maintained, and yet the void ratio of the hollow resin particle can be improved over previous ones.

Provided that the total mass of one or two or more of the monovinyl monomers mentioned above and one or two or more of the hydrophilic monomers mentioned above is regarded as 100% by mass, the total mass ratio of one or two or more of the hydrophilic monomers mentioned above is preferably 10 to 50% by mass, and more preferably 15 to 40% by mass. By the total mass ratio mentioned above of one or two or more hydrophilic monomers being 10 to 50% by mass, a base often easily permeates into the particle in the base addition step described later, a hollow portion in the particle is easily formed in a rapid manner, and furthermore copolymerization reaction of the monovinyl monomer and the hydrophilic monomer mentioned above easily progresses in a stable manner.

(B) Crosslinkable Monomer

In the present disclosure, the crosslinkable monomer means a compound having two or more polymerizable functional groups. The mechanical characteristics of the shell of the obtained hollow resin particle can be enhanced by using the crosslinkable monomer. Further, since the crosslinkable monomer has a plurality of polymerizable functional groups, molecules of (A) the monomer described above can be linked together, particularly the dissolving-out of hydrophilic monomers (among these, particularly an acid group-containing monomer) to the outside of the hollow resin particle can be suppressed, and furthermore the heat resistance of the obtained hollow resin particle can be enhanced.

The crosslinkable monomer is not particularly limited as long as it has two or more polymerizable functional groups. Examples of the crosslinkable monomer include divinyl benzene, diallyl phthalate, allyl (meth)acrylate, ethylene glycol di(meth)acrylate. Among them, divinyl benzene and ethylene glycol di(meth)acrylate are preferable.

Provided that the total mass of (A) the monomer and (B) the crosslinkable monomer is regarded as 100 parts by mass, the amount of (B) the crosslinkable monomer contained is preferably 1 to 59 parts by mass, more preferably 3 to 57 parts by mass, and still more preferably 5 to 55 parts by mass. When the amount mentioned above of (B) the crosslinkable monomer contained is 1 to 59 parts by mass, there is no fear that the obtained hollow resin particle will be dented, therefore the void ratio of the hollow resin particle can be maintained at a high level, and furthermore there is little fear that a large amount of the hydrocarbon solvent will remain in the hollow resin particle.

Incidentally, other polymerizable monomers may be contained in the mixture liquid as well as (A) the monomer and (B) the crosslinkable monomer.

(C) Oil-Soluble Polymerization Initiator

In the present disclosure, not an emulsion polymerization method using a water-soluble polymerization initiator but a suspension polymerization method using an oil-soluble polymerization initiator is employed. An advantage of employing the suspension polymerization method will be described in detail in "(2) Suspension preparation step".

The oil-soluble polymerization initiator is not particularly limited as long as it is a lipophilic one having a solubility in water of 0.2% by mass or less. Examples of the oil-soluble polymerization initiator include benzoyl peroxide, lauroyl peroxide, t-butyl peroxide 2-ethylhexanoate, 2,2'-azobis(2, 4-dimethylvaleronitrile), and azobis(isobutyronitrile).

Provided that the total mass of (A) the monomer and (B) the crosslinkable monomer is regarded as 100 parts by mass, the amount of (C) the oil-soluble polymerization initiator contained is preferably 0.1 to 10 parts by mass, more preferably 0.5 to 7 parts by mass, and still more preferably 1 to 5 parts by mass. By the amount mentioned above of the contained oil-soluble polymerization initiator being 0.1 to 10 parts by mass, polymerization reaction is caused to progress sufficiently, furthermore there is little fear that the oil-soluble polymerization initiator will be left after the end of polymerization reaction, and there is little fear that unexpected side reaction will progress.

(D) Fat/Fatty Oil

The fat/fatty oil in the present disclosure is not particularly limited as long as it is a lipophilic one having a solubility in water of 0.2% by mass or less, and any of vegetable oils, animal oils, and synthetic oils may be used.

As shown in (3) of FIG. 1, the whole or part of the fat/fatty oil 13 tends to be distributed in the shell 6, depending on the polarity of the fat/fatty oil 13. By adding a base to a precursor composition containing the precursor particle 20 in this state, the fat/fatty oil 13 is saponified (hydrolyzed), consequently a fatty acid and glycerin which have been chemically combined with each other to form the fat/fatty oil 13 are dissolved out to the surrounding aqueous medium 1, and shell defects 14 are formed ((4) of FIG. 1). Thereby, the inside and the outside of the precursor particle 20 communicate with each other.

Furthermore, by the saponification (hydrolysis) of the fat/fatty oil 13, the void ratio of the obtained hollow resin particle is improved in accordance with the elimination of the volume occupied by the fat/fatty oil 13. The void ratio of the hollow resin particle can be controlled by regulating the kind and the addition amount of the fat/fatty oil.

Examples of the fat/fatty oil include linoleic oil, lard oil, olive oil, coconut oil, castor oil, and cottonseed oil.

Provided that the total mass of (A) the monomer and (B) the crosslinkable monomer is regarded as 100 parts by mass, the amount of (D) the fat/fatty oil contained is preferably 1 to 20 parts by mass, more preferably 2 to 15 parts by mass, and still more preferably 5 to 12 parts by mass. By the amount mentioned above of the contained fat/fatty oil being 1 to 20 parts by mass, a moderate number of shell defects can be formed in the hollow resin particle in the obtained latex; as a result, the removal of the hydrocarbon solvent in the hollow resin particle progresses easily, and yet the mechanical characteristics of the hollow resin particle can be improved to such a degree that a hollow can be maintained.

(E) Hydrocarbon Solvent

The hydrocarbon solvent in the present disclosure has the function of forming a hollow portion in the interior of the particle.

In the suspension preparation step described later, a suspension in which monomer drops containing a hydrocarbon solvent are dispersed in an aqueous medium is obtained. In the suspension preparation step, phase separation occurs in the monomer drop; as a result, the hydrocarbon solvent with low polarity is likely to collect in the interior of the monomer drop. In the end, in the monomer drop, the hydrocarbon solvent is distributed in the interior and other materials than the hydrocarbon solvent are distributed at the periphery, in accordance with the respective polarities.

Then, in the polymerization step described later, a precursor composition containing precursor particles including the hydrocarbon solvent is obtained. That is, by the hydrocarbon solvent collecting in the interior of the particle, a hollow portion comprising the hydrocarbon solvent is formed in the interior of the obtained precursor particle.

Furthermore, in the case where a hydrophilic monomer (preferably an acid group-containing monomer) is used, a portion containing a hydrophilic monomer unit (preferably an acid group-containing monomer unit) of the shell is swollen in the base addition step described later, and thereby the removal of the hydrocarbon solvent is made easier.

The kind of the hydrocarbon solvent is not particularly limited. Examples of the hydrocarbon solvent include solvents with relatively high volatility, such as benzene, toluene, xylene, butane, pentane, hexane, cyclohexane, carbon disulfide, and carbon tetrachloride.

The relative permittivity at 20° C. of the hydrocarbon solvent used in the present disclosure is preferably 3 or less. The relative permittivity is an index indicating the level of the polarity of the compound. In the case where the relative permittivity of the hydrocarbon solvent is 3 or less, which is sufficiently small, it is presumed that phase separation progresses rapidly in the monomer drop and a hollow is easily formed.

Examples of solvents having a relative permittivity at 20° C. of 3 or less are as follows. The inside of the parentheses is the value of relative permittivity.

Heptane (1.9), cyclohexane (2.0), benzene (2.3), and toluene (2.4).

For the relative permittivity at 20° C., values written in known literatures (for example, the Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method for measuring the relative permittivity at 20° C. include a relative permittivity test that is in conformity with 23 of JIS C 2101:1999 and is performed with the measuring temperature set to 20° C.

The hydrocarbon solvent used in the present disclosure may be a hydrocarbon compound having 5 to 7 carbon atoms. A hydrocarbon compound having 5 to 7 carbon atoms is easily included into the precursor particle during the polymerization step, and furthermore can be easily removed from the interior of the precursor particle during the solvent removal step. Among these, the hydrocarbon solvent is preferably a hydrocarbon compound having 6 carbon atoms.

Provided that the total mass of (A) the monomer and (B) the crosslinkable monomer is regarded as 100 parts by mass, the amount of (D) the hydrocarbon solvent contained is preferably 100 to 900 parts by mass, more preferably 150 to 700 parts by mass, and still more preferably 200 to 500 parts by mass. By the amount mentioned above of (D) the hydrocarbon solvent contained being 100 to 900 parts by mass, the void ratio of the hollow resin particle in the obtained latex is made higher than before, and yet the mechanical characteristics of the hollow resin particle can be improved to such a degree that a hollow can be maintained.

(F) Suspension Stabilizer

The suspension stabilizer is an agent that stabilizes a suspension state in a suspension in a suspension polymerization method described later.

The suspension stabilizer may contain a surfactant. The surfactant is a material that forms a micelle including at least one monomer selected from the group consisting of a monovinyl monomer and a hydrophilic monomer, a crosslinkable monomer, an oil-soluble polymerization initiator, a fat/fatty oil, and a hydrocarbon solvent in the suspension polymerization method described later.

As the surfactant, any of cationic surfactants, anionic surfactants, and nonionic surfactants may be used, and these may be used in combination. Among these, anionic surfactants and nonionic surfactants are preferable, and anionic surfactants are more preferable.

Examples of the anionic surfactant include sodium dodecylbenzen sulfonate, sodium lauryl sulfate, dialkyl sodium sulfosuccinate and formalin condensate salt of naphthalene sulfonate.

Examples of the nonionic surfactant include polyoxyethylene alkyl ether, polyoxyethylene alkyl ester and polyoxyethylene sorbitan alkyl ester.

Examples of the cationic surfactant include didecyl dimethyl ammonium chloride and stearyl trimethyl ammonium chloride.

The suspension stabilizer may contain, for example, a hardly water-soluble inorganic compound or a water-soluble high molecule.

Provided that the total mass of (A) the monomer, (B) the crosslinkable monomer, (C) the oil-soluble polymerization initiator, and (E) the hydrocarbon solvent is regarded as 100 parts by mass, the amount of (F) the suspension stabilizer contained is preferably 0.1 to 3 parts by mass, more preferably 0.2 to 2 parts by mass, and still more preferably 0.3 to 1 parts by mass. In the case where the amount mentioned above of (F) the suspension stabilizer contained is 0.1 parts by mass or more, micelles are easily formed in an aqueous medium. On the other hand, in the case where the amount mentioned above of (F) the suspension stabilizer contained is 3 parts by mass or less, a reduction in productivity by increasing blowing in the step of removing the hydrocarbon solvent is less likely to occur.

(G) Aqueous Medium

In the present disclosure, the aqueous medium means a medium selected from the group consisting of water, a hydrophilic solvent, and a mixture of water and a hydrophilic solvent.

The hydrophilic solvent in the present disclosure is not particularly limited as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among aqueous media, water is preferably used in terms of its high polarity. In the case where a mixture of water and a hydrophilic solvent is used, it is important that the polarity of the entire mixture not be too low, from the viewpoint of forming monomer drops. In this case, for example, the mixing ratio (mass ratio) between water and the hydrophilic solvent may be set to water:hydrophilic solvent=99:1 to 50:50.

(H) Others

The mixture liquid prepared in the present step is a composition in a state where materials (A) to (G) mentioned above are simply mixed and have undergone, for example, stirring, as appropriate. In the mixture liquid, oil phases containing materials (A) to (E) mentioned above are dispersed in an aqueous medium, each with a size of a particle diameter of approximately several millimeters. The dispersion state of these materials in the mixture liquid can be observed with the naked eye, depending on the kinds of the materials.

The mixture liquid preparation step may be a step of mixing an oil phase containing (A) the monomer, (B) the crosslinkable monomer, (C) the oil-soluble polymerization initiator, (D) the fat/fatty oil, and (E) the hydrocarbon solvent, and an aqueous phase containing (F) the suspension stabilizer and (G) the aqueous medium. Hollow resin particles of which the compositions of the shell portions are uniform can be produced by thus separately preparing an oil phase and an aqueous phase in advance and then mixing them.

(2) Suspension Preparation Step

The present step is a step of carrying out a suspension treatment of the mixture liquid described above to prepare a suspension in which monomer drops containing the hydrocarbon solvent are dispersed in the aqueous medium.

In the suspension prepared in the present step, monomer drops each containing materials (A) to (E) mentioned above and having a particle diameter of approximately 0.1 μm to 9.0 μm are dispersed uniformly in the aqueous medium. Such monomer drops are difficult to observe with the naked eye, and can be observed with, for example, known observation equipment such as an optical microscope.

As described above, not an emulsion polymerization method but a suspension polymerization method is employed in the present disclosure. Thus, hereinbelow, an advantage of using a suspension polymerization method and an oil-soluble polymerization initiator is described with contrast to an emulsion polymerization method.

Figure 5:
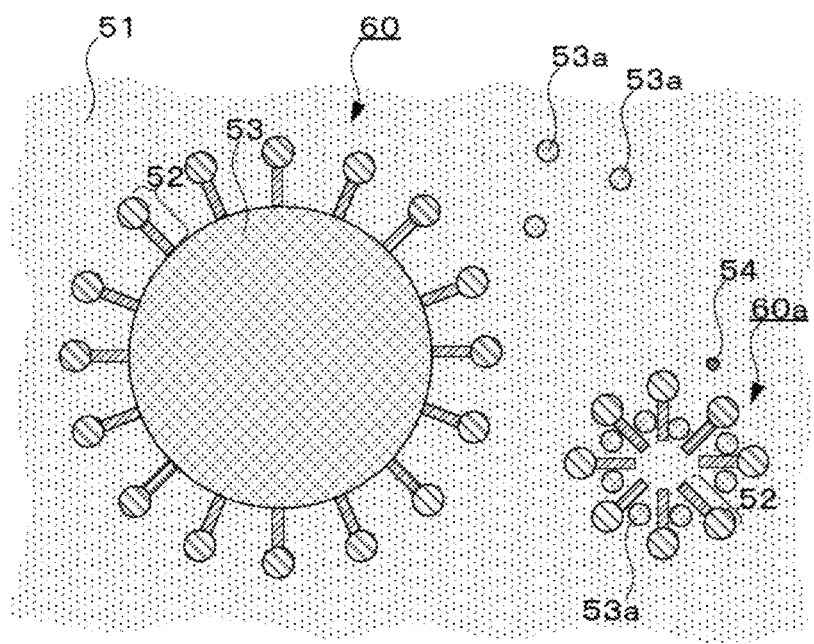
FIG. 5 is a schematic diagram showing a dispersion for conventional emulsion polymerization.

FIG. 5 is a schematic diagram showing a dispersion for emulsion polymerization. A micelle 60 in FIG. 5 schematically shows a cross section thereof.

FIG. 5 shows a situation where micelles 60, pieces of a micelle precursor 60a, pieces of a monomer 53a dissolved out in a solvent, and pieces of a water-soluble polymerization initiator 54 are dispersed in an aqueous medium 51. The micelle 60 is formed by a surfactant 52 surrounding the periphery of an oil-soluble monomer composition 53. The monomer composition 53 contains, for example, a monomer serving as a source material of a polymer, but does not contain a polymerization initiator.

On the other hand, the micelle precursor 60a is an aggregate of pieces of the surfactant 52, but does not contain a sufficient amount of the monomer composition 53 in the interior. The micelle precursor 60a incorporates, into its interior, pieces of the monomer 53a dissolved out in the solvent, and procures part of the monomer composition 53 from, for example, other micelles 60; thereby, grows into the micelle 60.

The water-soluble polymerization initiator 54 enters the interiors of the micelle 60 and the micelle precursor 60a while being diffused in the aqueous medium 51, and promotes the growth of oil drops in the interiors of these. Therefore, in the emulsion polymerization method, although each micelle 60 is monodispersed in the aqueous medium 51, it is predicted that the particle diameter of the micelle 60 will grow up to several hundred nanometers.

Figure 3:
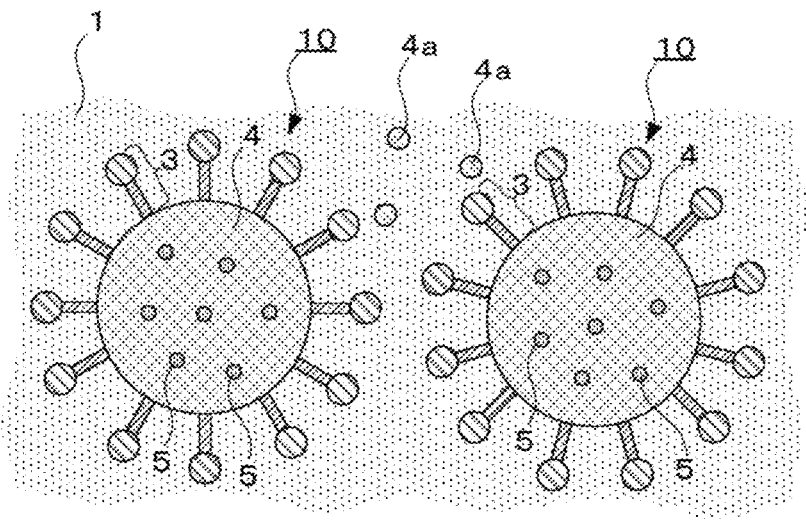
FIG. 3 is a schematic diagram showing an embodiment of a suspension in a suspension preparation step.

FIG. 3 is a schematic diagram showing an embodiment of a suspension in the present step. A micelle 10 in FIG. 3 schematically shows a cross section thereof. Incidentally, FIG. 3 is only a schematic diagram, and the suspension in the present disclosure is not necessarily limited to that shown in FIG. 3. Part of FIG. 3 corresponds to (2) of FIG. 1 described above.

FIG. 3 shows a situation where micelles 10 and pieces of monomers 4a (including (A) the monomer and (B) the crosslinkable monomer) are dispersed in an aqueous medium 1. The micelle 10 is formed by a surfactant 3 surrounding the periphery of an oil-soluble monomer composition 4. The monomer composition 4 contains an oil-soluble polymerization initiator 5, monomers (including (A) the monomer and (B) the crosslinkable monomer), and a hydrocarbon solvent (none of these is illustrated).

As shown in FIG. 3, in the present step, a minute oil drop in which the monomer composition 4 is contained in the interior of the micelle 10 is formed in advance, and then polymerization initiating radicals are generated in the minute oil drop by the oil-soluble polymerization initiator 5. Therefore, a precursor particle with a target particle diameter can be produced without excessively growing the minute oil drop.

Further, as can be seen by comparing suspension polymerization (FIG. 3) and emulsion polymerization (FIG. 5), suspension polymerization (FIG. 3) does not provide an opportunity for the oil-soluble polymerization initiator 5 to come into contact with the monomer 4a dispersed in the aqueous medium 1. Thus, the generation of surplus polymer particles in addition to latex particles each having a target hollow portion can be prevented by using an oil-soluble polymerization initiator.

An aspect of the present step is shown below. Incidentally, the present disclosure is not limited to the following aspect.

A mixture liquid containing materials (A) to (G) mentioned above is subjected to the suspension treatment to form monomer drops. The method for forming monomer drops is not particularly limited; for example, the formation is performed using an apparatus capable of performing strong stirring, such as an (in-line type) emulsifying disperser (manufactured by Pacific Machinery & Engineering Co., Ltd.; product name: MILDER) or a high-speed emulsifying disperser (manufactured by PRIMIX Corporation; product name: T. K. HOMOMIXER MARK II Type).

As described above, in the present step, phase separation occurs in the monomer drop, and therefore the hydrocarbon solvent with low polarity is likely to collect in the interior of the monomer drop. As a result, in the obtained monomer drop, the hydrocarbon solvent is distributed in the interior, and other materials than the hydrocarbon solvent are distributed at the periphery.

(3) Polymerization Step

The present step is a step of subjecting the suspension described above to polymerization reaction to prepare a precursor composition containing precursor particles each having a hollow portion and including the hydrocarbon solvent in the hollow portion. Here, the precursor particle is a particle formed mainly by copolymerization of (A) the monomer and (B) the crosslinkable monomer described above.

The polymerization system is not particularly limited; for example, a batch system, a semicontinuous system, or a continuous system may be employed. The polymerization temperature is preferably 40 to 80° C., and more preferably 50 to 70° C. Further, the reaction time of polymerization is preferably 1 to 20 hours, and more preferably 2 to 15 hours.

Since a monomer drop containing a hydrocarbon solvent in the interior is used, a hollow containing the hydrocarbon solvent is formed in the interior of the precursor particle, as described above.

(4) Base Addition Step

The present step is performed only in the first production method.

The present step is a step of adding a base to the precursor composition described above to set the pH of the precursor composition at 6.0 or more. The addition of a base serves as a trigger for the removal of the hydrocarbon solvent occupying the hollow portion of the precursor particle.

In the first production method of the present disclosure, the base has at least two functions. A first function is that the base reacts with the shell of the precursor particle and thereby swells a portion containing a hydrophilic monomer unit (preferably an acid group-containing monomer unit) of the shell. A second function is that the base reacts with the fat/fatty oil in the shell of the precursor particle and thereby saponifies (hydrolyzes) the fat/fatty oil to form shell defects. Both these functions create a chance of the removal of the hydrocarbon solvent occupying the hollow portion of the precursor particle contained in the precursor composition, and can promote the formation of a hollow portion in the interior of the precursor and enlarge the hollow portion.

The base used in the present step includes both of a proton accepting compound (a Brønsted base) and an electron pair donating compound (a Lewis base).

The base is not particularly limited, and examples include hydroxides of alkali metals such as sodium hydroxide, potassium hydroxide, and lithium hydroxide; hydroxides of alkaline earth metals such as calcium hydroxide and magnesium hydroxide; ammonia; amine compounds such as dimethylamine and diethanolamine; alkali metal (bi)carbonates such as sodium carbonate and potassium bicarbonate; and ammonium (bi)carbonates such as ammonium carbonate and ammonium bicarbonate. Among these, hydroxides of alkali metals are preferable.

The pH of the precursor composition after a base is added in the present step is usually 6.0 or more, preferably 6.5 or more, more preferably 7.0 or more, still more preferably 7.5 or more, and yet still more preferably 8.0 or more.

In the case where the precursor composition has a pH of 6.0 or more, the fat/fatty oil in the precursor particle can be saponified (hydrolyzed) sufficiently, and furthermore alkali-swelling can be caused to progress sufficiently.

The addition amount of the base is preferably an amount whereby the obtained precursor composition is made to have a pH of 6.0 or more by neutralizing at least part of acid groups in the shell of the precursor particle.

To swell a portion containing a hydrophilic monomer unit (preferably an acid group-containing monomer unit) of the shell of the precursor particle by adding a base to the precursor composition, it is necessary that the base be diffused in the precursor composition sufficiently. Thus, it is desired that stirring be sufficiently performed after the base is added. The time of treatment after adding the base is usually approximately 15 minutes to 60 minutes. The stability of the precursor composition may be reduced by the addition of the base; to prevent this, before adding the base, an anionic surfactant or a nonionic surfactant may be added to the precursor composition singly or in combination.

A latex is obtained by performing the following solvent removal step. Unless the addition of an acid or a base, for example, is further performed, the pH of the latex is the same as the pH of the precursor composition in the present step. Therefore, the pH of the obtained latex is preferably 6.0 or more, more preferably 6.5 or more, still more preferably 7.0 or more, yet still more preferably 7.5 or more, and particularly preferably 8.0 or more.

(5) Solvent Removal Step

The present step is a step of removing the hydrocarbon solvent included in the precursor particle in the precursor composition. By performing this step, a latex containing latex particles each having a hollow portion is obtained.

When removing the hydrocarbon solvent, the hydrocarbon solvent may be replaced with a gas or another liquid (for example, an aqueous medium in which latex particles are suspended); by selecting such a gas or another liquid as appropriate, the environment of the interior of the obtained latex particle can be changed, or a hollow resin particle can be produced from the latex particle.

In the case where the hydrocarbon solvent according to the above is used, the obtained precursor composition may be subjected to, for example, depressurization treatment, distillation treatment, steam stripping treatment, and gas bubbling treatment, or two or more of these treatments in combination; thereby, the hydrocarbon solvent can be easily removed from the hollow portion of the precursor particle. Further, the hydrocarbon solvent occupying the hollow portion can be easily replaced with water or an aqueous medium, and a latex containing latex particles in each of which water or the aqueous medium occupies the hollow portion can be obtained.

(6) Others

Examples of steps other than (1) to (5) mentioned above include a step of performing, as appropriate, drying treatment on a precursor composition containing precursor particles including a hydrocarbon solvent, or a latex containing latex particles obtained by replacing a hydrocarbon solvent contained in precursor particles with water or an aqueous medium. By this step, the interior of the precursor particle can be replaced with a gas (for example, air or an inert gas), and consequently a hollow resin particle can be produced. For the step of drying treatment, it is preferable to use a precursor composition containing precursor particles, or a latex containing latex particles.

(7) Latex

The characteristics of the latex obtained in the above manner are not particularly limited. The latex can be used for, for example, the formation of a heat insulating layer of thermal paper.

The number-average particle diameter of the latex particle contained in the obtained latex is preferably 0.1 to 10 µm, more preferably 0.5 to 8 µm, still more preferably 1 to 6 µm, yet still more preferably 1.5 to 5 µm, and particularly preferably 2 to 4 µm. The number-average particle diameter can be found by, for example, using a flow-type particle image analysis apparatus to measure the particle diameters of 1,000 to 10,000 latex particles contained in the latex and calculating the number average of them.

The void ratio of the latex particle contained in the obtained latex is preferably 70% or more, more preferably 72% or more, still more preferably 74% or more, yet still more preferably 78% or more, particularly preferably 80% or more, and more particularly preferably 82% or more. From the viewpoint of maintaining the strength of the particle, the void ratio of the latex particle may be 99% or less, and may be 95% or less. The void ratio can be found by using a transmission electron microscope to measure the maximum particle diameter and the maximum diameter of the void of each of 200 latex particles contained in the latex and performing the simple averaging of the void ratios obtained from the measurement results.

Hollow resin particles are obtained by subjecting the latex to drying treatment.

(8) Hollow Resin Particle

The characteristics of the hollow resin particle are not particularly limited. The number-average particle diameter, the shape, and the void ratio are given as physical properties of the hollow resin particle. Examples of evaluation items of the hollow resin particle include the amount of a volatile organic compound contained in the hollow resin particle and the heat resistance of the hollow resin particle.

A. Number-Average Particle Diameter of Hollow Resin Particle

The number-average particle diameter of the hollow resin particle is preferably 0.1 to 10 µm, more preferably 0.5 to 8 µm, still more preferably 1 to 6 µm, yet still more preferably 1.5 to 5 µm, and particularly preferably 2 to 4 µm.

The number-average particle diameter of the hollow resin particle can be found by, for example, using a laser diffraction particle size distribution measuring apparatus to measure a particle size distribution and calculating the number average of them.

The coefficient of variation of the number-average particle diameter of the hollow resin particle can be found by, for example, using a laser diffraction particle size distribution measuring apparatus to measure a particle size distribution on a number basis and dividing the standard deviation of the distribution by the number-average particle diameter.

In the first production method of the present disclosure, a hollow is formed without expanding the shell, and therefore hollow resin particles thus having a relatively small coefficient of variation of the number-average particle diameter (that is, hollow resin particles with a sharp particle size distribution) are obtained. Then, the sharper the particle size distribution of hollow resin particles is, the more flatly a coating film containing the hollow resin particles can be formed.

B. Shape of Hollow Resin Particle

The shape of the hollow resin particle is not particularly limited as long as a hollow portion is formed in the interior, and examples include a spherical shape, an ellipsoidal shape, and an irregular shape. Among these, a spherical shape is preferable in terms of ease of production.

The interior of the particle may have one or two or more hollow portions, and may be porous. The interior of the particle preferably has only one hollow portion in order to maintain good balance between a high void ratio of the hollow resin particle and mechanical strength of the hollow resin particle.

The average circularity of the hollow resin particle may be 0.950 to 0.995.

An example of an image of the shape of the hollow resin particle is a bag that comprises a thin covering film and is swollen with gas, and a cross-sectional view of the bag is like a hollow resin particle 100C in (5) of FIG. 2 described later. In this example, one thin covering film is provided on the outside, and the interior is filled with gas.

The shape of the particle can be determined by, for example, SEM or TEM. Further, the shape of the interior of the particle can be determined by cutting the particle into round slices by a known method and then performing SEM or TEM.

C. Void Ratio of Hollow Resin Particle

The void ratio of the hollow resin particle is preferably 70% or more, more preferably 72% or more, still more preferably 74% or more, yet still more preferably 78% or more, particularly preferably 80% or more, and more particularly preferably 82% or more. From the viewpoint of maintaining the strength of the particle, the void ratio of the hollow resin particle may be 99% or less, and may be 95% or less.

The void ratio (%) of the hollow resin particle is calculated by Formula (I) below by using the apparent density $D_1$ and the true density $D_0$ of the hollow resin particle.

Void ratio (%)=100−(Apparent density $D_1$/True density $D_0$)×100     Formula (I)

A method for measuring the apparent density $D_1$ of the hollow resin particle is as follows. First, approximately 30 cm³ of hollow resin particles are introduced into a measuring flask with a volume of 100 cm³, and the mass of the introduced hollow resin particles is precisely weighed. Next, the measuring flask in which the hollow resin particles are introduced is precisely filled with isopropanol up to the marked line while care is taken so that air bubbles do not get in. The mass of the isopropanol added to the measuring flask is precisely weighed, and the apparent density $D_1$ (g/cm³) of the hollow resin particle is calculated on the basis of Formula (II) below.

Apparent density $D_1$=[Mass of the hollow resin particles]/(100−[Mass of the isopropanol]÷[Specific gravity of isopropanol at the measuring temperature])     Formula (II)

The apparent density $D_1$ is equivalent to the specific gravity of the whole hollow resin particle in the case where the hollow portion is regarded as part of the hollow resin particle.

A method for measuring the true density $D_0$ of the hollow resin particle is as follows. Hollow resin particles are pulverized in advance; then, approximately 10 g of pulverized pieces of hollow resin particles are introduced into a measuring flask with a volume of 100 cm³, and the mass of the introduced pulverized pieces is precisely weighed. After that, similarly to the measurement of the apparent density mentioned above, isopropanol is added to the measuring flask, the mass of the isopropanol is precisely weighed, and the true density $D_0$ (g/cm³) of the hollow resin particle is calculated on the basis of Formula (III) below.

True density $D_0$=[Mass of the pulverized pieces of hollow resin particles]/(100−[Mass of the isopropanol]÷[Specific gravity of isopropanol at the measuring temperature])     Formula (III)

The true density $D_0$ is equivalent to the specific gravity of the shell portion alone of the hollow resin particle. As is clear from the measurement method mentioned above, when calculating the true density $D_0$, the hollow portion is not regarded as part of the hollow resin particle.

The void ratio of the hollow resin particle can be reworded as the ratio of the hollow portion in the specific gravity of the hollow resin particle.

D. Amount of Volatile Organic Compound Contained in Hollow Resin Particle

The amount of the volatile organic compound contained in the hollow resin particle of the present disclosure is usually 5% by mass or less, preferably 4% by mass or less, more preferably 3% by mass or less, still more preferably 2% by mass or less, yet still more preferably 1% by mass or less, and particularly preferably less than 1% by mass.

In the present disclosure, the "volatile organic compound contained in the hollow resin particle" refers to an organic compound with a boiling point of 400° C. or less among the organic compounds contained in the hollow resin particle. Typical examples of the volatile organic compound include a hydrocarbon solvent used in a production method described later and unreacted monomers, but the volatile organic compound is not necessarily limited to these typical examples.

A method for measuring the amount of the volatile organic compound contained in the hollow resin particle is as follows. Approximately 100 mg of hollow resin particles are put into a 30-mL screw cap glass bottle, and are precisely weighed. Subsequently, approximately 10 g of tetrahydrofuran (THF) is put in, and is precisely weighed. The mixture in the glass bottle is stirred for 1 hour with a stirrer, and the volatile organic compound contained in the hollow resin particles is extracted. The stirring is stopped, and the resin components of the hollow resin particles insoluble in THF are precipitated; then, a filter (manufactured by Advantec; product name: MEMBRANE FILTER 25JP020AN) is installed at a syringe barrel, and the precipitate is filtered out to obtain a sample liquid; and the sample liquid is injected into gas chromatography (GC) to be analyzed. The amount (% by mass) of the volatile organic compound per unit mass of the hollow resin particle is found from a peak area of GC and a working curve created in advance. Detailed analysis conditions are as follows.

(Analysis Conditions)
Apparatus: GC-2010 (manufactured by Shimadzu Corporation)
Column: DB-5 (manufactured by Agilent Technologies Japan, Ltd.)
df=0.25 μm, 0.25 mm I.D.×30 m
Detector: FID
Carrier gas: nitrogen (linear velocity: 28.8 cm/sec)
Temperature of the injection port: 200° C.
Temperature of the detector: 250° C.
Temperature of the oven: raised from 40° C. to 230° C. at a rate of 10° C./minute, and held at 230° C. for 2 minutes
Amount of sampling: 2 μL E. Heat Resistance of Hollow Resin Particle The hollow resin particle of the present disclosure is less apt to cause little collapse of the external shape and the internal shape even under high temperature conditions, and can therefore maintain a hollow.

A possible example of the index of heat resistance is the rate of change in density d from before to after heat treatment of the hollow resin particle.

A method for calculating the rate of change in density d is as follows. First, hollow resin particles are allowed to stand still for 10 minutes in an electric furnace set at 200° C. to perform heat treatment. Next, the apparent density of the hollow resin particle taken out of the electric furnace is measured by a similar method to the method for measuring the apparent density $D_1$ mentioned above.

When the apparent density of the hollow resin particle after heat treatment is denoted by $D_a$ and the apparent density of the hollow resin particle before heat treatment is denoted by $D_b$ (=the apparent density $D_1$ mentioned above), the rate of change in density d (%) is calculated on the basis of Formula (IV) below.

$$d=\{|D_a-D_b|/D_b\}\times 100 \quad \text{Formula (IV)}$$

A smaller rate of change in density d means that the influence of heat treatment on the hollow resin particle is smaller, that is, the heat resistance of the hollow resin particle is higher.

F. Uses of Hollow Resin Particle

A possible example of use of the hollow resin particle is an under-coating material of thermal paper. In general, an under-coating material is required to have heat insulating properties and shock-absorbing properties (cushioning properties), and is required to have, in addition to these, heat resistance in line with thermal paper uses. The hollow resin particle of the present disclosure can meet these requirements by virtue of its high void ratio, hard-to-crush hollow shape, relatively small number-average particle diameter, and high heat resistance.

Further, the hollow resin particle is useful as, for example, a plastic pigment excellent in gloss or masking power. Further, a hollow resin particle obtained by enclosing a useful component, such as a perfume, a medicine, an agricultural chemical, or an ink component, in the interior by a means such as immersion treatment or depressurized or pressurized immersion treatment can be used for any of various uses in accordance with the component contained in the interior.

2. Second Production Method

A production method of the present disclosure includes (1) a mixture liquid preparation step, (2) a suspension preparation step, (3) a polymerization step, (4) a solid-liquid separation step, and (5) a solvent removal step. The steps of the production method of the present disclosure are not limited to these five steps.

Figure 2:
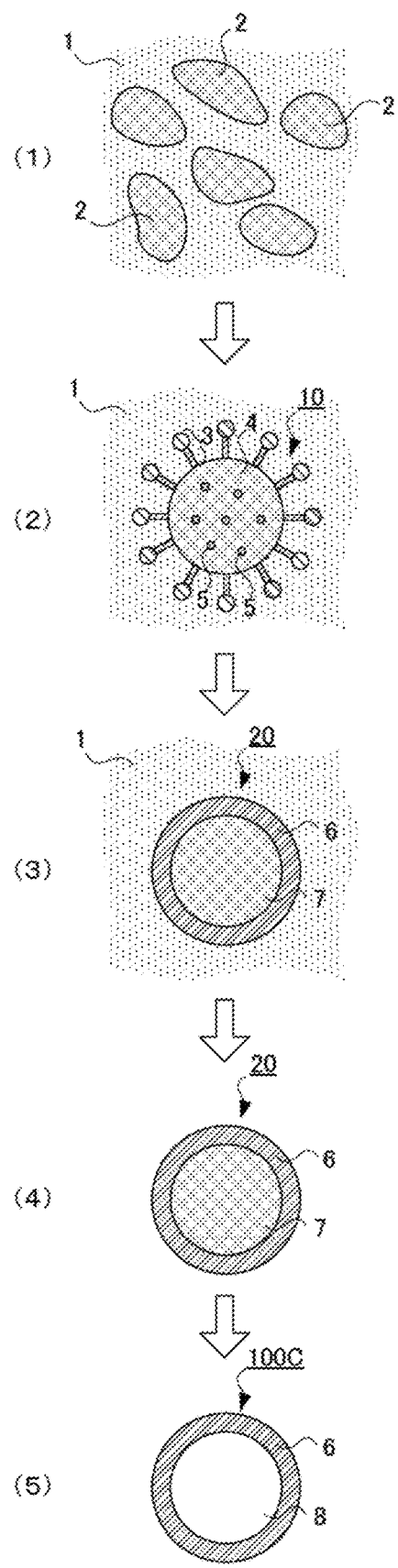
FIG. 2 is a schematic diagram showing an example of a second production method of the present disclosure (a method for producing hollow resin particles).

FIG. 2 is a schematic diagram showing an example of the second production method of the present disclosure. (1) to (5) in FIG. 2 correspond to steps (1) to (5) mentioned above, respectively. The white arrow between drawings is one for indicating the order of the steps.

(1) and (2) of FIG. 2 correspond to (1) and (2) of FIG. 1, respectively. Further, (3) of FIG. 2 corresponds to (3) of FIG. 1 except that the fat/fatty oil 13 is not contained in the shell 6.

(4) of FIG. 2 is a schematic cross-sectional view showing an embodiment of a precursor particle after the solid-liquid separation step. This (4) of FIG. 2 shows a state where an aqueous medium 1 is separated from the state of (3) of FIG. 2 mentioned above.

(5) of FIG. 2 is a schematic cross-sectional view showing an embodiment of a hollow resin particle after the solvent removal step. This (5) of FIG. 2 shows a state where a hydrocarbon solvent 7 is removed from the state of (4) of FIG. 2 mentioned above. As a result, a hollow resin particle 100C having a hollow portion 8 in the interior of a shell 6 is obtained.

Hereinbelow, the five steps mentioned above and other steps are described in order, centering on points different from the first production method.

(1) Mixture Liquid Preparation Step

The present step is a step of preparing a mixture liquid containing (A) at least one monomer selected from the group consisting of a monovinyl monomer and a hydrophilic monomer (provided that acrylonitrile and methacrylonitrile are excluded), (B) a crosslinkable monomer, (C) an oil-soluble polymerization initiator, (E) a hydrocarbon solvent, (F) a suspension stabilizer, and (G) an aqueous medium.

In the second production method, it is not necessary to use (D) a fat/fatty oil like in the first production method mentioned above. In the second production method, it is preferable that the mixture liquid does not contain a fat/fatty oil.

In the second production method, neither acrylonitrile nor methacrylonitrile is used as the hydrophilic monomer. This is because these monomers, each of which contains a nitrile group vulnerable to heat, are poor in heat resistance and consequently the void ratio of the obtained particle is low, as shown in Comparative Example II-5 described later.

In the mixture liquid used for the second production method, provided that the total mass of (A) the monomer and (B) the crosslinkable monomer is regarded as 100 parts by mass, the amount of (B) the crosslinkable monomer contained is usually 25 to 59 parts by mass, preferably 28 to 58 parts by mass, more preferably 30 to 57 parts by mass, and still more preferably 35 to 55 parts by mass. When the amount mentioned above of (B) the crosslinkable monomer contained is 25 to 59 parts by mass, there is no fear that the obtained hollow resin particle will be dented, therefore the void ratio of the hollow resin particle can be maintained at a high level, and furthermore there is little fear that a large amount of the hydrocarbon solvent will remain in the hollow resin particle.

Incidentally, other polymerizable monomers may be contained in the mixture liquid as well as (A) the monomer and (B) the crosslinkable monomer.

The mixture liquid preparation step may be a step of mixing an oil phase that contains the at least one monomer selected from the group consisting of a monovinyl monomer and a hydrophilic monomer, the crosslinkable monomer, the oil-soluble polymerization initiator, and the hydrocarbon solvent mentioned above and in which the amount of the contained crosslinkable monomer is 25 to 59 parts by mass provided that the total mass of the at least one monomer selected from the group consisting of a monovinyl monomer and a hydrophilic monomer and the crosslinkable monomer mentioned above is regarded as 100 parts by mass, with an aqueous phase containing the suspension stabilizer and the aqueous medium mentioned above. Hollow resin particles of which the compositions of the shell portions are uniform can be produced by thus separately preparing an oil phase and an aqueous phase in advance and then mixing them.

(2) Suspension Preparation Step and (3) Polymerization Step

These two steps in the second production method are not particularly different from the case of the first production method.

(4) Solid-Liquid Separation Step

The present step is a step of performing solid-liquid separation of the precursor composition described above to obtain precursor particles.

In the case where, as shown in Comparative Example II-3 described later, a hydrocarbon solvent included in a precursor particle is removed in a slurry containing an aqueous medium, there is a problem that the obtained hollow resin particle is crushed unless the same volume of water as the hydrocarbon solvent released from the interior of the precursor particle enters the interior of the particle.

A possible method to prevent this is a method in which, as described above, the pH of the slurry made of the precursor composition is set to 6.0 or more to alkali-swell the shell of the precursor particle and then the hydrocarbon solvent is removed (see the first production method mentioned above). In this case, since the shell of the precursor particle acquires flexibility, replacement of the hydrocarbon solvent in the interior of the precursor particle with water progresses rapidly, and a precursor particle including water is obtained.

In contrast, in the second production method, solid-liquid separation of the slurry after the polymerization step is performed, and then the obtained solid components are dried in a gaseous atmosphere. In this case, the same volume of air as the hydrocarbon solvent released from the interior of the precursor particle enters the interior of the particle easily, and thus a hollow resin particle keeping a hollow shape is obtained. Then, the precursor particle including the hydrocarbon solvent has a tendency of being less apt to crush than a precursor particle including water.

The reason why a precursor particle including a hydrocarbon solvent is less apt to crush than a precursor particle including water still remains unclear. However, a mechanism like below is inferred in the case where the free volume of a polymer contained in the shell is taken into account.

In a model proposed by H. Eyring et al. that describes the structure of liquid, it is stated that liquid comprises molecules and a free volume (that is, spaces where molecules do not exist). It is stated that the free volume in liquid is made of a gathering of voids each with a size approximately equal to the size of a molecule, and an approximately 3% free volume occupies the interior of liquid at ordinary temperature and pressure. This model can be applied also to a solid structure containing molecules having regularity, such as a polymer.

In the present disclosure, the polarity of a polymer contained in the shell of the precursor particle is generally high. Therefore, it is presumed that water is well compatible with the polymer and water molecules are easily incorporated into the free volume of the polymer. In other words, the solubility coefficient of water molecules to the polymer is high. On the other hand, a hydrocarbon solvent is poorly compatible with the polymer due to the low polarity of the hydrocarbon solvent. In other words, the solubility coefficient of hydrocarbon solvent molecules to the polymer is low. As a result, hydrocarbon solvent molecules are less apt to be incorporated into the free volume of the polymer.

Therefore, in a particle including water, water molecules are incorporated into the free volume of a polymer contained in the shell, and thus the volume of the spaces where molecules do not exist is reduced in the shell; as a result, gas transmissivity in the shell is reduced, the inflow of air due to the vaporization of water at the time of drying is less apt to progress, and the particle is likely to be crushed. In contrast, in a particle including a hydrocarbon solvent, hydrocarbon solvent molecules are less apt to be incorporated into the free volume of the polymer, and therefore gas transmissivity in the shell is kept relatively high; as a result, in the solvent removal step, replacement of the hydrocarbon solvent with air progresses rapidly, and a hollow resin particle maintaining a hollow portion is generated.

The method for performing solid-liquid separation of the precursor composition is not particularly limited as long as it is a method that separates the solid components containing precursor particles and the liquid components containing the aqueous medium without removing the hydrocarbon solvent included in the precursor particle, and known methods may be used. Examples of the method of solid-liquid separation include the centrifugation method, the filtration method, and still-standing separation; among these, the centrifugation method or the filtration method may be used, and the centrifugation method may be employed from the viewpoint of simplicity of operation.

An arbitrary step such as a preliminary drying step may be performed at a time after the solid-liquid separation step and before performing the solvent removal step described later. Examples of the preliminary drying step include a step of performing preliminary drying on the solid components obtained after the solid-liquid separation step with a drying apparatus such as a dryer or a drying appliance such as a hand dryer.

(5) Solvent Removal Step

The present step is a step of removing the hydrocarbon solvent included in the precursor particle in a gaseous atmosphere to obtain a hollow resin particle.

"In a gaseous atmosphere" in the present step strictly means being in an environment where no liquid components exist in the outside of the precursor particle and being in an environment where only a very small amount of liquid components at a level that does not influence the removal of the hydrocarbon solvent exist in the outside of the precursor particle. "In a gaseous atmosphere" can be reworded as a state where the precursor particle does not exist in a slurry, or can be reworded as a state where the precursor particle exists in a dry powder. That is, in the present step, it is important to remove the hydrocarbon solvent in an environment where the precursor particle is in direct contact with gas in the outside.

The fact that, as shown in Example II-1 to Example II-4 described later, a hollow resin particle after it has undergone vacuum drying during the solvent removal step and is then returned to normal pressure maintains a spherical shape is presumed to be evidence that the gas transmissivity of the shell itself is relatively high.

It is generally known that the gas transmissivity of, for example, nylon and ethylene vinyl alcohol (EVOH) is improved in high humidity. This is understood to be because these polymers are plasticized due to water molecules and consequently the mobility of these polymers is increased. However, a hollow resin particle of the present disclosure, particularly a hollow resin particle obtained by the second production method, is presumed to have a high degree of crosslinking, and is therefore surmised to be less influenced by plasticization by the action of the aqueous medium. Thus, the fact that the shell of the hollow resin particle has gas transmissivity in the present disclosure is presumed to be due to properties peculiar to a polymer contained in the shell.

The method for removing the hydrocarbon solvent in the precursor particle in a gaseous atmosphere is not particularly limited, and known methods may be employed. Examples of the method include the reduced pressure drying method, the heat drying method, and the flash drying method, and use of these methods in combination.

In particular, in the case where the heat drying method is used, the heating temperature needs to be set to more than or equal to the boiling point of the hydrocarbon solvent and less than or equal to the highest temperature at which the shell structure of the precursor particle does not collapse. Therefore, depending on the composition of the shell in the precursor particle and the kind of the hydrocarbon solvent, the heating temperature may be 50 to 200° C., may be 70 to 180° C., and may be 100 to 150° C.

The hydrocarbon solvent in the interior of the precursor particle is replaced with gas in the outside by drying operation in a gaseous atmosphere; as a result, a hollow resin particle in which the gas occupies the hollow portion is obtained.

The drying atmosphere is not particularly limited, and may be selected depending on the use of the hollow resin particle, as appropriate. Possible examples of the drying atmosphere include air, oxygen, nitrogen, and argon. Further, also a hollow resin particle of which the interior is a vacuum is temporarily obtained by once filling the interior of the hollow resin particle with gas and then performing reduced pressure drying.

(6) Others

A possible example of a step other than (1) to (5) mentioned above is a step in which the gas in the interior of the hollow resin particle is replaced with another gas or liquid. By such replacement, the environment of the interior of the hollow resin particle can be changed, molecules can be selectively confined in the interior of the hollow resin particle, or the chemical structure of the interior of the hollow resin particle can be modified in accordance with uses.

The description regarding the first production method described above can be applied to the second production method as long as there is no hindrance. Further, also the description regarding the second production method can be applied to the first production method described above as long as there is no hindrance.

EXAMPLES

Hereinbelow, the present invention is described more specifically using Examples and Comparative Examples; but the present invention is not limited to these Examples. Incidentally, "parts" and "%" are on a mass basis unless otherwise specified.

The test methods performed in the present Examples and Comparative Examples are as follows.

Example Series I

I-1. Production of Latex Containing Hollow Resin Particles

Example I-1

(1) Mixture Liquid Preparation Step

The materials mentioned below were added to a stirring apparatus-equipped pressure resistant vessel in which 325 parts of ion-exchanged water as an aqueous medium was added, and the contents in the vessel were stirred to disperse the materials mentioned below in ion-exchanged water; thus, a mixture liquid was prepared.

Anionic surfactant: 0.3 parts
Butyl acrylate (BA): 6 parts
Methyl methacrylate (MMA): 15 parts
Methacrylic acid (MAA, a hydrophilic monomer (an acid group-containing monomer)): 9 parts
Cyclohexane: 100 parts
Linoleic oil: 3 parts
Divinylbenzene: 2 parts
2,2'-Azobis(2,4-dimethylvaleronitrile) (an oil-soluble polymerization initiator, manufactured by Wako Pure Chemical Industries, Ltd.; product name: V-65): 0.63 parts (2) Suspension Preparation Step The mixture liquid mentioned above was stirred with an emulsifying disperser to be suspended, and a suspension in which monomer drops containing cyclohexane were dispersed in water was prepared.

(3) Polymerization Step

The suspension mentioned above was put into a reaction vessel in which 0.6 parts of an anionic surfactant was added, the temperature was raised to 65° C., and then the temperature condition of 65° C. was maintained for 3 hours to perform polymerization reaction. By this polymerization reaction, a precursor composition containing precursor particles including cyclohexane was prepared. After that, the reaction vessel was cooled to room temperature.

(4) Base Addition Step

To the precursor composition after cooling mentioned above, a 10%-by-mass sodium hydroxide aqueous solution was added until the pH of the mixture became 7.0. Incidentally, the addition of the sodium hydroxide aqueous solution was performed while the precursor composition was stirred with the in-line type emulsifying disperser.

(5) Solvent Removal Step

A defoaming agent was further added within the range of 0.1 to 0.5 parts by mass to 100 parts by mass of the precursor composition that had undergone the base addition step mentioned above, the state was maintained at 70° C. for 6 hours while nitrogen was blown in at a flow velocity of 6 min/L, and cyclohexane was removed from the precursor particle; thus, a latex (Example I-1) was obtained. The result of transmission electron microscopic observation has shown that this latex was a latex containing latex particles each having a hollow portion (the same applies hereinafter).

Example I-2

A latex (Example I-2) was obtained by a similar production method to Example I-1 except that the pH was altered from 7.0 to 7.5 in "(4) the base addition step" of Example I-1.

Example I-3

A latex (Example I-3) was obtained by a similar production method to Example I-1 except that the pH was altered from 7.0 to 8.5 in "(4) the base addition step" of Example I-1.

Comparative Example I-1

A latex (Comparative Example I-1) was obtained by a similar production method to Example I-1 except that "(4) the base addition step" of Example I-1 was not performed. Incidentally, the particle contained in the latex was not a latex particle having a hollow portion.

Comparative Example I-2

A latex (Comparative Example I-2) was obtained by a similar production method to Example I-1 except that the pH was altered from 7.0 to 5.0 in "(4) the base addition step" of Example I-1. Incidentally, the particle contained in the latex was not a latex particle having a hollow portion.

Comparative Example I-3

A latex (Comparative Example I-3) was obtained by a similar production method to Example I-1 except that divinylbenzene was not added in "(1) the dispersion preparation step" of Example I-1. Incidentally, the particle contained in the latex was not a latex particle having a hollow portion.

Comparative Example I-4

A latex (Comparative Example I-4) was obtained by a similar production method to Example 1 except that methacrylic acid (MAA, a hydrophilic monomer (an acid group-containing monomer)) was not added in "(1) the dispersion preparation step" of Example I-1. Incidentally, the particle contained in the latex was not a latex particle having a hollow portion.

Comparative Example I-5

A latex (Comparative Example I-5) was obtained by a similar production method to Example I-1 except that linoleic oil was not added in "(1) the dispersion preparation step" of Example I-1. Incidentally, the particle contained in the latex was not a latex particle having a hollow portion.

I-2. Evaluation of Latex

The measurement of the void ratio and the number-average particle diameter was performed on the latex particle contained in the latex of each of Example I-1 to Example I-3 and Comparative Example I-1 to Comparative Example I-5. Details are as follows.

(1) Void Ratio of Latex Particle Having Hollow Portion

Using a transmission electron microscope (product name: "H-7500"; manufactured by Hitachi, Ltd.), the maximum particle diameter and the maximum diameter of the hollow portion were measured for each of 200 latex particles each having a hollow portion that were contained in the latex of each of Example I-1 to Example I-3. These two measurement values were used to find the void ratio of each latex particle by Formula (A) below, and the simple averaging of the resulting values was performed, then the value thus obtained was taken as the void ratio of the latex particle.

$$\text{Void ratio (\%)} = \{(\text{Maximum diameter of the hollow portion})^3/(\text{Maximum particle diameter})^3\} \times 100 \quad \text{Formula (A)}$$

Incidentally, for the latex particle contained in the latex of each of Comparative Example I-1 to Comparative Example I-5, a hollow portion was not observed, and thus the calculation of the void ratio was not performed.

(2) Number-Average Particle Diameter of Latex Particle

The concentration of latex particles in the latex was adjusted so as to be 3,000 to 10,000/μL at the time of measurement, then the particle diameter of each of 1,000 to 10,000 latex particles was measured using a flow-type particle image analysis apparatus (product name: "FPIA-3000"; manufactured by Sysmex Corporation), the number average of the particle diameters was calculated, and the obtained value was taken as the number-average particle diameter of the latex particle.

The results of measurement and evaluation of the latex of each of Example I-1 to Example I-3 and Comparative Example I-1 to Comparative Example I-5 are shown in Table 1 below. Incidentally, for the latex particle contained in the latex of each of Comparative Example I-1 to Comparative Example I-5, a hollow portion was not observed as described above, and thus the void ratio of the latex particle is not written in Table I-1 below.

TABLE 1-1

|  |  | Example I-1 | Example I-2 | Example I-3 |
|---|---|---|---|---|
| Anionic surfactant (part) | | 0.9 | 0.9 | 0.9 |
| Monomer | BA (part) | 6 | 6 | 6 |
|  | MMA (part) | 15 | 15 | 15 |
|  | MAA (part) | 9 | 9 | 9 |
| Cyclohexane (part) | | 100 | 100 | 100 |
| Linoleic oil (part) | | 3 | 3 | 3 |

TABLE 1-1-continued

| | | | |
|---|---|---|---|
| Divinylbenzene (part) | 2 | 2 | 2 |
| Oil-soluble polymerization initiator (part) | 0.63 | 0.63 | 0.63 |
| Ion-exchanged water (part) | 325 | 325 | 325 |
| pH of Precursor composition | 7.0 | 7.5 | 8.0 |
| pH of Latex | 7.0 | 7.5 | 8.0 |
| Void ratio (%) | 80 | 80 | 80 |
| Number-average particle diameter (μm) | 4.4 | 4.3 | 4.4 |

| | Comparative Example 1-1 | Comparative Example 1-2 | Comparative Example 1-3 | Comparative Example 1-4 | Comparative Example 1-5 |
|---|---|---|---|---|---|
| Anionic surfactant (part) | 0.9 | 0.9 | 0.9 | 0.9 | 0.9 |
| Monomer    BA (part) | 6 | 6 | 6 | 9 | 6 |
| MMA (part) | 15 | 15 | 15 | 21 | 15 |
| MAA (part) | 9 | 9 | 9 | 0 | 9 |
| Cyclohexane (part) | 100 | 100 | 100 | 100 | 100 |
| Linoleic oil (part) | 3 | 3 | 3 | 3 | 0 |
| Divinylbenzene (part) | 2 | 2 | 0 | 2 | 2 |
| Oil-soluble polymerization initiator (part) | 0.63 | 0.63 | 0.63 | 0.63 | 0.63 |
| Ion-exchanged water (part) | 325 | 325 | 325 | 325 | 325 |
| pH of Precursor composition | — | 5.0 | 7.0 | 7.0 | 7.0 |
| pH of Latex | — | 5.0 | 7.0 | 7.0 | 7.0 |
| Void ratio (%) | — | — | — | — | — |
| Number-average particle diameter (μm) | 4.1 | 4.0 | — | 4.4 | 4.3 |

I-3. Consideration

Hereinbelow, the results of evaluation of the latex are investigated with reference to Table I-1.

From Table I-1, it has been found that the latex particle contained in the latex of Comparative Example I-1 has a number-average particle diameter of 4.1 μm and does not have a hollow portion. Therefore, it can be seen that, if a base is not added to the precursor composition, a latex particle not having a hollow portion is obtained. This is presumed to be because, in the case where a base is not added, a portion containing a hydrophilic monomer unit of the shell of the precursor particle does not develop alkali-swelling and the dissolving-out of the fat/fatty oil.

From Table I-1, it has been found that the latex particle contained in the latex of Comparative Example I-2 has a number-average particle diameter of 4.0 μm and does not have a hollow portion. Therefore, it can be seen that, even when a base is added to the precursor composition, a latex particle not having a hollow portion is obtained unless the precursor composition has a pH of 6.0 or more. This is presumed to be because, in the case where the precursor composition does not have a pH of 6.0 or more, the alkali-swelling of a portion containing a hydrophilic monomer unit of the shell of the precursor particle is insufficient.

From Table I-1, it has been found that, in the latex particle contained in the latex of Comparative Example I-3, the shell is dissolved and aggregated, and consequently the number-average particle diameter cannot be measured and a hollow portion is not present. Therefore, it can be seen that, in the case where a crosslinkable monomer is not used, a latex particle not having a hollow portion is obtained. This is presumed to be because, although a portion containing a hydrophilic monomer unit of the shell of the precursor particle develops alkali-swelling by the addition of a base, the portion is dissolved out into the aqueous medium as the crosslinkable monomer is not used, and consequently a hollow portion cannot be maintained and the precursor particle is crushed.

From Table I-1, it has been found that the latex particle contained in the latex of Comparative Example I-4 has a number-average particle diameter of 4.4 μm and does not have a hollow portion. Therefore, it can be seen that, in the case where a hydrophilic monomer is not used, a latex particle not having a hollow portion is obtained. This is presumed to be because, in the case where a hydrophilic monomer is not used, the obtained precursor particle does not develop swelling by a base.

From Table I-1, it has been found that the latex particle contained in the latex of Comparative Example I-5 has a number-average particle diameter of 4.3 μm and does not have a hollow portion. Therefore, it can be seen that, in the case where a fat/fatty oil is not used, a latex particle not having a hollow portion is obtained. This is presumed to be because, in the case where a fat/fatty oil is not used, defects do not occur in the shell of the precursor particle and therefore the included hydrocarbon solvent cannot be removed in the solvent removal step.

On the other hand, from Table I-1, it has been found that the latex particle contained in the latex of each of Example I-1 to Example I-3 has a number-average particle diameter of 4.3 to 4.4 μm and has a void ratio of 80%.

Therefore, it has been proven that a latex containing latex particles each with a higher void ratio than before can be produced with good efficiency by preparing a mixture liquid, a suspension, and a precursor composition in order, adding a base to the obtained precursor composition, and removing a hydrocarbon solvent included in precursor particles. Incidentally, hollow resin particles are obtained by performing a drying step on the latex.

Example Series II

II-1. Production of Hollow Resin Particles

Example II-1

(1) Mixture Liquid Preparation Step

First, materials (a1) to (d1) below were mixed. The obtained mixture was used as an oil phase.
- (a1) Methacrylic acid: 41 parts
- (b) Ethylene glycol dimethacrylate: 59 parts
- (c) 2,2'-Azobis(2,4-dimethylvaleronitrile) (an oil-soluble polymerization initiator, manufactured by Wako Pure Chemical Industries, Ltd.; product name: V-65): 3 parts
- (e1) Cyclohexane: 300 parts Next, 3 parts of (f) a surfactant was added to 800 parts of (g) ion-exchanged water. The obtained mixture was used as an aqueous phase.

The aqueous phase and the oil phase were mixed, and thus a mixture liquid was prepared.

(2) Suspension Preparation Step

The mixture liquid mentioned above was stirred with an emulsifying disperser to be suspended, and a suspension in which monomer drops containing cyclohexane were dispersed in water was prepared.

(3) Polymerization Step

The suspension mentioned above was stirred in a nitrogen atmosphere at 65° C. for 4 hours, and polymerization reaction was performed. By this polymerization reaction, a precursor composition containing precursor particles including cyclohexane was prepared.

(4) Solid-Liquid Separation Step

The obtained precursor composition was subjected to centrifugation with a cooling high-speed centrifuge (manufactured by Kokusan Co. Ltd.; product name: H-9R) using a rotor MN1, under the conditions of a rate of rotation of 3000 rpm and a centrifugation time of 20 minutes, and the solid components were dehydrated. The solid components after dehydration were dried with a dryer at a temperature of 40° C., and precursor particles including cyclohexane were obtained.

(5) Solvent Removal Step

The precursor particles were subjected to heating treatment with a vacuum dryer at 150° C. for 15 hours in a gaseous atmosphere, and thereby resin particles of Example II-1 were obtained. From the result of scanning electron microscopic observation and the value of the void ratio, it has been determined that the resin particle is spherical and has only one hollow portion.

Example II-2

Resin particles of Example II-2 were obtained by a similar production method to Example II-1 except that the materials and the addition amounts shown in Table II-1 were employed in "(1) the mixture liquid preparation step" of Example II-1. From the result of scanning electron microscopic observation and the value of the void ratio, it has been determined that the resin particle is spherical and has only one hollow portion.

Example II-3

Resin particles of Example II-3 were obtained by a similar production method to Example II-1 except that the materials and the addition amounts shown in Table II-1 were employed in "(1) the mixture liquid preparation step" of Example II-1 and filtration was employed in "(4) the solid-liquid separation step". From the result of scanning electron microscopic observation and the value of the void ratio, it has been determined that the resin particle is spherical and has only one hollow portion.

Incidentally, the solid-liquid separation step using filtration in Example II-3 is as follows. The precursor composition obtained by the polymerization step were dehydrated using a pressure filter (manufactured by Advantec Toyo Co., Ltd.; product name: KST-90-UH) and qualitative filter paper (manufactured by Advantec Toyo Co., Ltd.; No. 2) under the condition of a pressure of 0.29 MPa to obtain solid components. The solid components after dehydration were dried with a dryer at a temperature of 40° C., and precursor particles including cyclohexane were obtained.

Example II-4

Resin particles of Example II-4 were obtained by a similar production method to Example II-1 except that the materials and the addition amounts shown in Table II-1 were employed in "(1) the mixture liquid preparation step" of Example II-1. From the result of scanning electron microscopic observation and the value of the void ratio, it has been determined that the resin particle is spherical and has only one hollow portion.

Comparative Example II-1

Resin particles of Comparative Example II-1 were obtained by a similar production method to Example II-1 except that the materials and the addition amounts shown in Table II-1 were employed in "(1) the mixture liquid preparation step" of Example II-1. The amount of the volatile organic compound is 30% by mass in these resin particles, and hence it has been determined that a large amount of the hydrocarbon solvent is left in these resin particles. Further, the measurement of the true density was unable to be performed on these resin particles. From the result of scanning electron microscopic observation, it has been determined that these resin particles are spherical.

Comparative Example II-2

Resin particles of Comparative Example II-2 were obtained by a similar production method to Example II-3 except that the materials and the addition amounts shown in Table II-1 were employed in "(I) the mixture liquid preparation step" of Example II-3. From the result of scanning electron microscopic observation, it has been determined that these resin particles are crushed and have irregular shapes.

Comparative Example II-3

A precursor composition containing precursor particles including cyclohexane was prepared by performing the "(1) the mixture liquid preparation step", "(2) the suspension preparation step" and "(3) the polymerization step" similar to those of Example II-1 except that the materials and the addition amounts shown in Table II-1 were employed. After that, 0.3 parts of a defoaming agent was added into the precursor composition, the state was maintained at 90° C. for 15 hours while nitrogen was blown in at a flow velocity of 6 min/L to remove cyclohexane from the precursor particle.

The obtained precursor particles were subjected to heating treatment at 40° C. for 24 hours with a dryer at normal pressure; thereby, water was completely removed, and resin particles of Comparative Example II-3 were obtained. From the result of scanning electron microscopic observation, it has been determined that these resin particles are crushed and have irregular shapes.

Comparative Example II-4

Resin particles of Comparative Example II-4 were obtained by a similar production method to Example II-1 except that the materials and the addition amounts shown in Table II-1 were employed in "(1) the mixture liquid preparation step" of Example II-1. The amount of the volatile organic compound is 55% by mass in these resin particles, and hence it has been determined that a large amount of the hydrocarbon solvent is left in these resin particles. Further, the measurement of the true density was unable to be performed on these resin particles. From the result of scanning electron microscopic observation, it has been determined that these resin particles are spherical.

Comparative Example II-5

First, materials (a2), (α1), (α2), (c), and (e2) below were mixed. The obtained mixture was used as an oil phase.
(a2) Methyl methacrylate: 5 parts
(α1) Acrylonitrile: 60 parts
(α2) Methacrylonitrile: 35 parts
(c) Azobis(isobutyronitrile): 5 parts
(e2) Isopentane: 30 parts Next, 200 parts of (y) a colloidal silica dispersion (the average particle diameter: 5 nm; the effective concentration of colloidal silica: 20% by mass) was added to 600 parts of (g) ion-exchanged water. The obtained mixture was used as an aqueous phase.

The aqueous phase and the oil phase were mixed, and thus a mixture liquid was prepared.

The mixture liquid mentioned above was stirred with a disperser (manufactured by Primix Corporation; product name: HOMOMIXER) for 1 minute under the condition of a rate of rotation of 4,000 rpm, and was suspended. The obtained suspension was stirred for 10 hours under a temperature condition of 60° C., and polymerization reaction was performed.

The suspension after the end of polymerization reaction was filtered, and the obtained solid components were dried with a dryer at 40° C. to obtain thermally expandable microcapsules.

Then, 100 parts of obtained thermally expandable microcapsules were subjected to heating treatment with a dryer at 180° C. for 3 minutes in a gaseous atmosphere, and thereby resin particles (hollow resin particles) of Comparative Example II-5 were obtained.

II-2. Measurement and Evaluation of Resin Particles

The following measurement and evaluation were performed on the resin particles of each of Example II-1 to Example II-4 and Comparative Example II-1 to Comparative Example II-5. Details are as follows.

(1) Measurement of Number-Average Particle Diameter of Resin Particle and Calculation of Coefficient of Variation The particle diameter of each resin particle was measured using a laser diffraction particle size distribution measuring instrument (manufactured by Shimadzu Corporation; product name: SALD-2000), the number average of them was calculated, and the obtained value was taken as the number-average particle diameter of the resin particle.

As the coefficient of variation, a value obtained by a method in which the standard deviation of the particle diameters on a number basis obtained by the measurement mentioned above was divided by the number-average particle diameter was taken.

(2) Observation of Shape of Particle

Figure 4A:
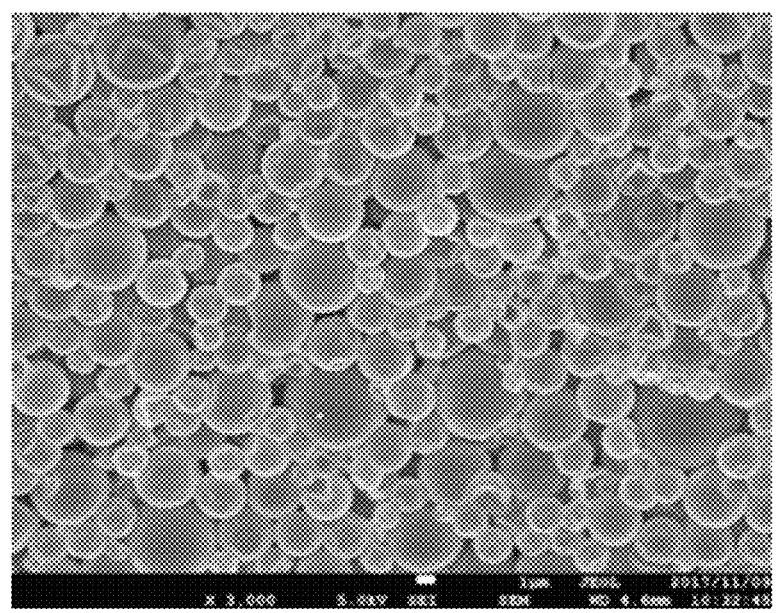
FIG. 4A is a SEM image of hollow resin particles of Example II-1.
Figure 4B:
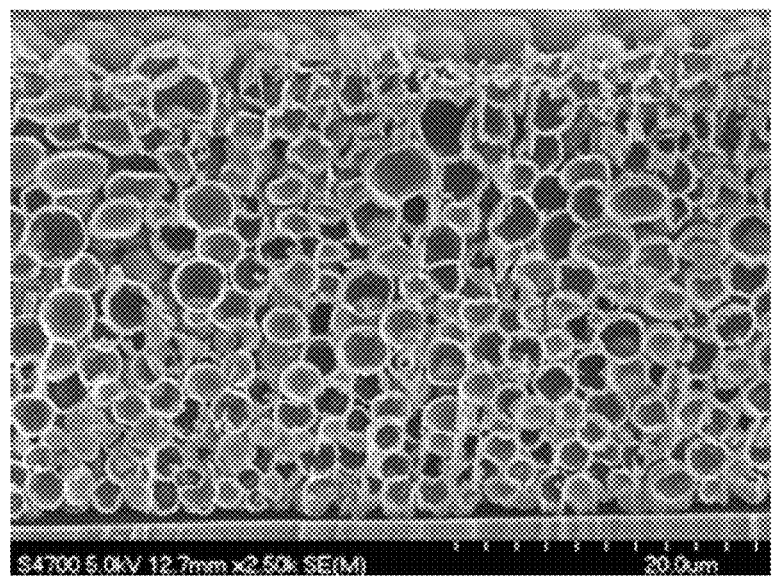
FIG. 4B is a SEM image of a cross section of hollow resin particles of Example II-1.

FIG. 4A is a SEM image of hollow resin particles of Example II-1. FIG. 4B is a SEM image of a cross section of hollow resin particles of Example II-1.

The conditions for SEM observation are as follows.
Scanning electron microscopes:
Manufactured by JEOL Ltd.; model number: JSM-7610F (FIG. 4A)
Manufactured by Hitachi, Ltd.; model number: S-4700 (FIG. 4B)
Acceleration voltage: 5.0 kV (FIG. 4A and FIG. 4B)
Magnification: 3,000 times (FIG. 4A), 2,500 times (FIG. 4B)

By these drawings, it can be determined that the interior of the particle of Example II-1 is hollow and that, although the interior is hollow, the particle is not crushed but maintains a spherical shape.

(3) Measurement of Density of Resin Particle and Calculation of Void Ratio

A. Measurement of Apparent Density of Resin Particle

First, approximately 30 cm$^3$ of resin particles were introduced into a measuring flask with a volume of 100 cm$^3$, and the mass of the introduced resin particles was precisely weighed. Next, the measuring flask in which the resin particles were introduced was precisely filled with isopropanol up to the marked line while care was taken so that air bubbles did not get in. The mass of the isopropanol added to the measuring flask was precisely weighed, and the apparent density $D_1$ (g/cm$^3$) of the resin particle was calculated on the basis of Formula (II) below.

$$\text{Apparent density } D_1 = [\text{Mass of the resin particles}]/\\ (100-[\text{Mass of the isopropanol}]\div[\text{Specific gravity of isopropanol at the measuring temperature}]) \quad \text{Formula (II)}$$

B. Measurement of True Density of Resin Particle

Resin particles were pulverized in advance; then, approximately 10 g of pulverized pieces of resin particles were introduced into a measuring flask with a volume of 100 cm$^3$, and the mass of the introduced pulverized pieces was precisely weighed.

After that, similarly to the measurement of the apparent density mentioned above, isopropanol was added to the measuring flask, the mass of the isopropanol was precisely weighed, and the true density Do (g/cm$^3$) of the resin particle was calculated on the basis of Formula (III) below.

$$\text{True density } D_0 = [\text{Mass of the pulverized pieces of resin particles}]/(100-[\text{Mass of the isopropanol}]\div\\ [\text{Specific gravity of isopropanol at the measuring temperature}]) \quad \text{Formula (III)}$$

C. Calculation of Void Ratio

A value calculated by Formula (I) below by using the apparent density $D_1$ and the true density Do of the hollow resin particle was taken as the void ratio (%) of the hollow resin particle.

$$\text{Void ratio (\%)} = 100 - (\text{Apparent density } D_1/\text{True density } D_0) \times 100 \quad \text{Formula (I)}$$

(4) Amount of Volatile Organic Compound Contained in Hollow Resin Particle

A method for measuring the amount of the volatile organic compound contained in the hollow resin particle is as follows. Approximately 100 mg of hollow resin particles were put into a 30-mL screw cap glass bottle, and were precisely weighed. Subsequently, approximately 10 g of tetrahydrofuran (THF) was put in, and was precisely weighed. The mixture in the glass bottle was stirred for 1 hour with a stirrer, and the hydrocarbon solvent remaining in the interiors of the particles was extracted. The stirring was stopped, and the resin components of the hollow resin particles insoluble in THF were precipitated; then, a filter (manufactured by Advantec; product name: Membrane FILTER 25JP02AN) was installed at a syringe barrel, and the precipitate was filtered out to obtain a sample liquid; and the sample liquid was injected into gas chromatography (GC) to be analyzed. The amount (% by mass) of the volatile organic compound per unit mass of the hollow resin particle was found from a peak area of GC and a working curve created in advance. Detailed analysis conditions are as follows.

(Analysis Conditions)

Apparatus: GC-2010 (manufactured by Shimadzu Corporation)

Column: DB-5 (manufactured by Agilent Technologies Japan, Ltd.)

df=0.25 μm, 0.25 mm I.D.×30 m

Detector: FID

Carrier gas: nitrogen (linear velocity: 28.8 cm/sec)

Temperature of the injection port: 200° C.

Temperature of the detector: 250° C.

Temperature of the oven: raised from 40° C. to 230° C. at a rate of 10° C./minute, and held at 230° C. for 2 minutes Amount of sampling: 2 μL (5) Evaluation of Heat Resistance of Resin Particle First, resin particles were allowed to stand still for 10 minutes in an electric furnace set at 200° C. to perform heat treatment. Next, the apparent density of the resin particle taken out of the electric furnace was measured by a similar method to "(3) Measurement of density of resin particle and calculation of void ratio" mentioned above.

When the apparent density of the resin particle after heat treatment is denoted by $D_a$ and the apparent density of the resin particle before heat treatment is denoted by $D_b$, the rate of change in density d (%) was calculated on the basis of Formula (IV) below.

$$d=(|D_a-D_b|/D_b)\times 100 \quad \text{Formula (IV)}$$

A smaller rate of change in density d means that the influence of heat treatment on the resin particle is smaller, that is, the heat resistance of the resin particle is higher.

The results of measurement and evaluation of the resin particles of each of Example II-1 to Example II-4 and Comparative Example II-1 to Comparative Example II-5 are shown in Table II-1 below. Incidentally, in Table II-1, the description of "<1" indicates that the amount of the volatile organic compound is less than 1% by mass.

TABLE II-1

|  |  | Example II-1 | Example II-2 | Example II-3 | Example II-4 |
|---|---|---|---|---|---|
| Monomer | Methacrylic acid (part) | 41 | 20 | 15 | 40 |
|  | Methyl methacrylate (part) | — | 25 | 45 | 20 |
|  | Butyl acrylate (part) | — | 10 | 15 | — |
|  | Acrylonitrile (part) | — | — | — | — |
|  | Methacrylonitrile (part) | — | — | — | — |
| Crosslinkable monomer | Ethylene glycol dimethacrylate (part) | 59 | 45 | 25 | — |
|  | Divinylbenzene (part) | — | — | — | 40 |
|  | Oil-soluble polymerization initiator (part) | 3 | 3 | 3 | 3 |
| Hydrocarbon solvent | Cyclohexane (part) | 300 | 600 | 300 | 300 |
|  | Isopentane (part) | — | — | — | — |
|  | Hexadecane (part) | — | — | — | — |
|  | Surfactant (part) | 3 | 3 | 3 | 2 |
| Other additive | Linoleic oil (part) | — | — | — | — |
|  | Colloidal silica dispersion (part) | — | — | — | — |
|  | Ion-exchanged water (part) | 800 | 800 | 600 | 800 |
|  | Solid-liquid separation | Centrifugation | Centrifugation | Filtration | Centrifugation |
| Condition for removal of solvent | Heating temperature (° C.) | 150 | 150 | 150 | 150 |
|  | Heating time (hr) | 15 | 15 | 15 | 15 |
|  | State of heating | Gaseous atmosphere | Gaseous atmosohare | Gaseous atmosphere | Gaseous atmosphere |
|  | Number-average particle diameter (μm) | 3.5 | 3.8 | 3.3 | 6.0 |
|  | Coefficient of variation | 0.10 | 0.09 | 0.10 | 0.11 |
|  | Amount of volatile organic compound (mass %) | <1 | <1 | <1 | <1 |
|  | Shape of particle | Spherical shape | Spherical shape | Spherical shape | Spherical shape |
|  | Apparent density D1 (g/cm3) | 0.23 | 0.13 | 0.25 | 0.30 |
|  | True density D0 (g/cm3) | 1.20 | 1.18 | 1.18 | 1.19 |
|  | Void ratio (%) | 81 | 88 | 79 | 75 |
|  | Rate of change in density after heat treatment d (%) | 2 | 1 | 2 | 5 |

TABLE II-1-continued

|  |  | Comparative Example II-1 | Comparative Example II-2 | Comparative Example II-3 | Comparative Example II-4 | Comparative Example II-5 |
|---|---|---|---|---|---|---|
| Monomer | Methacrylic acid (part) | 35 | 20 | 15 | — | — |
|  | Methyl methacrylate (part) | — | 50 | 45 | — | 5 |
|  | Butyl acrylate (part) | — | 10 | 15 | — | — |
|  | Acrylonitrile (part) | — | — | — | — | 60 |
|  | Methacrylonitrile (part) | — | — | — | — | 35 |
| Crosslinkable monomer | Ethylene glycol dimethacrylate (part) | 65 | 20 | 25 | — | — |
|  | Divinylbenzene (part) | — | — | — | 100 | — |
|  | Oil-soluble polymerization initiator (part) | 3 | 3 | 3 | 3 | 5 |
| Hydrocarbon solvent | Cyclohexane (part) | 300 | 303 | 600 | — | — |
|  | Isopentane (part) | — | — | — | — | 30 |
|  | Hexadecane (part) | — | — | — | 150 | — |
|  | Surfactant (part) | 3 | 3 | 3 | 3 | — |
| Other additive | Linoleic oil (part) | — | — | — | — | — |
|  | Colloidal silica dispersion (part) | — | — | — | — | 200 |
|  | Ion-exchanged water (part) | 800 | 800 | 800 | 800 | 600 |
|  | Solid-liquid separation | Centrifugation | Filtration | none | Centrifugation | Filtration |
| Condition for removal of solvent | Heating temperature (° C.) | 150 | 150 | 90 | 150 | 180 |
|  | Heating time (hr) | 15 | 15 | 15 | 15 | 0.05 |
|  | State of heating | Gaseous atmosphere | Gaseous atmosphere | Liquid atmosphere | Gaseous atmosphere | Gaseous atmosphere |
| Number-average particle diameter (μm) |  | 3.5 | 2.0 | 1.8 | 3.5 | 20 |
| Coefficient of variation |  | 0.10 | 0.25 | 0.22 | 0.11 | 0.31 |
| Amount of volatile organic compound (mass %) |  | 30 | <1 | <1 | 55 | <1 |
| Shape of particle |  | Spherical shape | Indefinite shape | Indefinite shape | Spherical shape | Spherical shape |
| Apparent density D1 (g/cm3) |  | 0.45 | 0.94 | 0.78 | 0.83 | 0.17 |
| True density D0 (g/cm3) |  | Unable | 1.18 | 1.18 | Unable | 1.21 |
| Void ratio (%) |  | — | 20 | 33 | — | 86 |
| Rate of change in density after heat treatment d (%) |  | 2 | 1 | 1 | 20 | 87 |

II-3. Consideration

Hereinbelow, the results of evaluation of each resin particle are investigated with reference to Table II-1.

From Table II-1, it has been found that the resin particle of Comparative Example II-1 is spherical. However, the amount of the remaining hydrocarbon is as large as 30% and the removal of the solvent in the interior of the particle is not carried out sufficiently, and the target hollow resin particle has not been obtained. Provided that the total mass of the at least one monomer selected from the group consisting of a monovinyl monomer and a hydrophilic monomer and the crosslinkable monomer is regarded as 100 parts by mass, the addition amount of the crosslinkable monomer is as large as 65 parts by mass; thus, it is presumed that the degree of crosslinking is high and cyclohexane is hindered from permeating. In the production method of Comparative Example II-1, the solvent removal step requires long time, and hence it can be said that productivity is low.

From Table II-1, it has been found that the resin particle of Comparative Example II-2 is crushed and has an irregular shape. Provided that the total mass of the at least one monomer selected from the group consisting of a monovinyl monomer and a hydrophilic monomer and the crosslinkable monomer is regarded as 100 parts by mass, the addition amount of the crosslinkable monomer is as small as 20 parts by mass; thus, it is presumed that the degree of crosslinking is low and consequently the shell does not have an enough strength to withstand a situation where the interior of the particle temporarily becomes negative pressure at the time of the removal of cyclohexane.

From Table II-1, it has been found that the resin particle of Comparative Example II-3 is crushed and has an irregular shape. Only particles having void ratios as low as 33% were obtained. Therefore, it can be seen that the resin particle is crushed when the removal of cyclohexane included in the particle is attempted in the aqueous medium without performing solid-liquid separation. The reason is surmised as follows. First, it is presumed that, when the removal of cyclohexane is attempted in the aqueous medium, water molecules outside the particle enter the interior of the particle in place of cyclohexane and furthermore water molecules fill the free volume of a polymer contained in the shell of the particle. Therefore, it is presumed that the transmissivity of gas in the interior of the polymer is reduced; consequently, in the subsequent solvent removal step, air equivalent to water molecules that have run away to the outside of the particle does not enter the interior of the particle, and hence the hollow portion cannot be maintained and the resin particle is crushed.

From Table II-1, it has been found that the resin particle of Comparative Example II-4 is spherical. However, the amount of the volatile organic compound was as large as 55% by mass and the removal of the solvent in the interior of the particle was not carried out sufficiently, and the target hollow resin particle was not obtained. This is presumed to be because only the crosslinkable monomer was used as the monomer, and therefore the degree of crosslinking was high and cyclohexane was hindered from permeating. In the production method of Comparative Example II-4, the solvent removal step requires long time, and hence it can be said that productivity is low.

From Table II-1, it has been found that, for the resin particle of Comparative Example II-5, the rate of change in density d after heat treatment is 87%, and the rate of change in density d is highest among the resin particles subjected to experiment this time. Therefore, it can be seen that the void ratio of the resin particle decreases rapidly due to heat treatment in the case where the crosslinkable monomer is not used and acrylonitrile and methacrylonitrile are used at 95% by mass of all the monomers in total. This is presumed to be because the crosslinkable monomer, which imparts heat resistance to the shell of the resin particle, was not used but instead a large amount of acrylonitrile and methacrylonitrile, which are vulnerable to heat, were used greatly, and consequently the obtained resin particle was poor in heat resistance.

On the other hand, from Table II-1, it has been found that, in all of the hollow resin particles of Example II-1 to Example II-4, the amount of the volatile organic compound is as small as less than 1% by mass, the shape is spherical, the void ratio is as high as 75% or more, and the rate of change in density d after heat treatment is as low as 5% or less.

Therefore, it has been proven that hollow resin particles each having a higher void ratio than before and having excellent heat resistance can be produced with high productivity by using the materials described above to prepare a mixture liquid, a suspension, and a precursor composition in order, performing solid-liquid separation of the obtained precursor composition, and then removing a hydrocarbon solvent included in precursor particles.

REFERENCE SYMBOLS LIST

1 Aqueous medium
2 Low polarity material
3 Suspension stabilizer
4 Monomer composition
4a Monomer Dispersed in Aqueous medium
5 Oil-soluble polymerization initiator
6 Shell
7 Hydrocarbon solvent
8 Hollow portion
10 Micelle
13 Fat/Fatty oil
14 Shell defect
20 Precursor particle
51 Aqueous medium
52 Surfactant
53 Monomer composition
53a Monomer Dissolved out to Aqueous medium
54 Water-soluble polymerization initiator
60 Micelle
60a Micelle precursor
61 Core resin particle
62 Shell
63 Hollow core
64 Hollow portion
100A Latex particle having Hollow portion
100B Latex
100C Hollow resin particle
200B Core-shell particle
200C Hollow particle

The invention claimed is:

1. A method for producing a latex comprising latex particles each having a hollow portion, the method comprising steps of:
preparing a mixture liquid comprising (A) at least one monomer selected from the group consisting of a monovinyl monomer and a hydrophilic monomer, (B) a crosslinkable monomer, (C) an oil-soluble polymerization initiator, (D) a fat/fatty oil, (E) a hydrocarbon solvent, (F) a suspension stabilizer and (G) an aqueous medium;
carrying out a suspension treatment of the mixture liquid to prepare a suspension which comprises monomer drops comprising the hydrocarbon solvent dispersed in the aqueous medium;
carrying out a polymerization reaction of the suspension to prepare a precursor composition comprising precursor particles each having a hollow portion including the hydrocarbon solvent;
adding a base to the precursor composition to set a pH of the precursor composition at 6.0 or more; and,
removing the hydrocarbon solvent included in the precursor particles in the precursor composition to obtain the latex comprising the latex particles each having the hollow portion.

2. The method according to claim 1, wherein the at least one monovinyl monomer and the at least one hydrophilic monomer are used in combination with each other.

3. The method according to claim 2, wherein an amount ratio of the at least one hydrophilic monomer is from 10% to 50% by mass provided that a total amount of the at least one monovinyl monomer and the at least one hydrophilic monomer is regarded as 100% by mass.

4. The method according to claim 1, wherein a number average particle diameter of the latex particles included in the obtained latex is from 0.1 μm to 10 μm.

5. The method according to claim 1, wherein a void ratio of the latex particles included in the obtained latex is 70% to 99%.

6. A method for producing hollow resin particles, the method comprising steps of:
preparing a mixture liquid comprising (A) a monomer comprising at least one acrylic-based hydrophilic monomer selected from the group consisting of acrylic acid and methacrylic acid, the acrylic-based hydrophilic monomer excluding acrylonitrile and methacrylonitrile, or a monomer comprising a combination of at least one acrylic-based monovinyl monomer selected from the group consisting of acrylate and methacrylate, the acrylic-based monovinyl monomer excluding a hydrophilic monomer selected from the group consisting of monomers having an ethylenically unsaturated bond and a hydrophilic group, and at least one acrylic-based hydrophilic monomer selected from the group consisting of acrylic acid and methacrylic acid, the acrylic-based hydrophilic monomer excluding acrylonitrile and methacrylonitrile (B) a crosslinkable monomer, (C) an oil-soluble polymerization initiator, (E) a hydrocarbon solvent, (F) a suspension stabilizer and (G) an aqueous medium, wherein a mass ratio of the acrylic-based hydrophilic monomer to the acrylic-based monovinyl monomer in the monomer (A) represented by "[the acrylic-based hydrophilic monomer]:[the acrylic-based monovinyl monomer]" is from 100:0 to 20:80, and wherein an amount of the contained crosslinkable monomer (B) is from 25 parts by mass to 59 parts by mass provided that a total amount of the monomer (A) and the crosslinkable monomer (B) is regarded as 100 parts by mass;
carrying out a suspension treatment of the mixture liquid to prepare a suspension which comprises monomer drops comprising the hydrocarbon solvent (E) dispersed in the aqueous medium;

carrying out a polymerization reaction of the suspension to prepare a precursor composition comprising precursor particles each having a hollow portion including the hydrocarbon solvent;

carrying out a solid-liquid separation of the precursor composition to obtain the precursor particles; and, removing the hydrocarbon solvent included in the precursor particles in a gaseous atmosphere to obtain the hollow resin particles.

7. The method according to claim 6, wherein a method for solid-liquid separation of the precursor composition is centrifugation or filtration.

8. The method according to claim 6, wherein the step of preparing the mixture liquid is a step of mixing an oil phase comprising the monomer (A), the crosslinkable monomer (B), the oil-soluble polymerization initiator (C), and the hydrocarbon solvent (E), wherein a mass ratio of the acrylic-based hydrophilic monomer to the acrylic-based monovinyl monomer in the monomer (A) represented by "[the acrylic-based hydrophilic monomer]:[the acrylic-based monovinyl monomer]" is from 100:0 to 20:80, and wherein an amount of the contained crosslinkable monomer (B) is from 25 parts by mass to 59 parts by mass provided that a total amount of the monomer (A) and the crosslinkable monomer (B) is regarded as 100 parts by mass, with an aqueous phase comprising the suspension stabilizer (F) and the aqueous medium (G).

9. The method according to claim 6, wherein a relative permittivity of the hydrocarbon solvent (E) is 3 or less at 20° C.

10. The method according to claim 6, wherein the hydrocarbon solvent (E) is a hydrocarbon compound having 5 to 7 carbon atoms.

11. The method according to claim 6, wherein an amount of the hydrocarbon solvent (E) is 200 parts by mass or more provided that a total amount of the monomer (A) and the crosslinkable monomer (B) is regarded as 100 parts by mass.

12. The method according to claim 6, wherein a number average particle diameter of the obtained hollow resin particles is from 0.1 μm to 10 μm.

13. The method according to claim 6, wherein a void ratio of the obtained hollow resin particles is from 70% to 99%.

* * * * *